United States Patent [19]

Shaw

[11] 4,209,996

[45] Jul. 1, 1980

[54] RECIPROCATING COMPRESSOR REFRIGERATION SYSTEM USING STEP EXPANSION AND AUTO STAGING

[75] Inventor: David N. Shaw, Unionville, Conn.

[73] Assignee: Dunham-Bush, Inc., West Hartford, Conn.

[21] Appl. No.: 950,905

[22] Filed: Oct. 12, 1978

Related U.S. Application Data

[63] Continuation-in-part of Ser. No. 924,015, Jul. 11, 1978, which is a continuation-in-part of Ser. No. 882,729, Mar. 2, 1978, which is a continuation-in-part of Ser. No. 806,407, Jun. 14, 1977, Pat. No. 4,148,436, which is a continuation-in-part of Ser. No. 782,675, Mar. 30, 1977, Pat. No. 4,086,072, which is a continuation-in-part of Ser. No. 653,586, Jan. 29, 1976, Pat. No. 4,058,988.

[51] Int. Cl.² ............................................. F25B 7/00
[52] U.S. Cl. .................... 62/175; 62/196 B; 62/238; 237/2 B
[58] Field of Search .............. 62/510, 2, 175, 196 B, 62/324; 237/2 B; 236/1 EA

[56] References Cited

U.S. PATENT DOCUMENTS 3,527,059  9/1970  Rust et al. ..................... 62/175 X
4,151,724  5/1979  Garland ........................ 62/510 X Primary Examiner—William E. Wayner
Attorney, Agent, or Firm—Sughrue, Rothwell, Mion, Zinn & Macpeak

[57] ABSTRACT

A compression module in the form of a four cylinder reciprocating piston compressor, having two cylinders for each of two cylinder heads, is interconnected by conduits and manifolds which in turn incorporate solenoid operated control valves and check valves to provide five pressure levels for the compressor cylinders to remove automatically intermediate pressure refrigerant and to return intermediate pressure refrigerant, to achieve single or multiple cylinder compressor staging, and effect unloading of one head by cutting off low pressure suction return to that compressor head. The multiple cylinder, multiple level, automatic staging, reciprocating piston compression module is particularly applicable to a refrigeration system employing common, discharge, suction, liquid drain and liquid feed manifolds, with flow controlled by suitable solenoid operated control valves and check valves and for use in systems including subcooler and accumulator coils and for a heat pump; an outside air coil, a thermal energy storage/direct solar energy heat supply coil, an inside space heating and cooling coil and a high pressure condenser, hot water coil.

18 Claims, 7 Drawing Figures

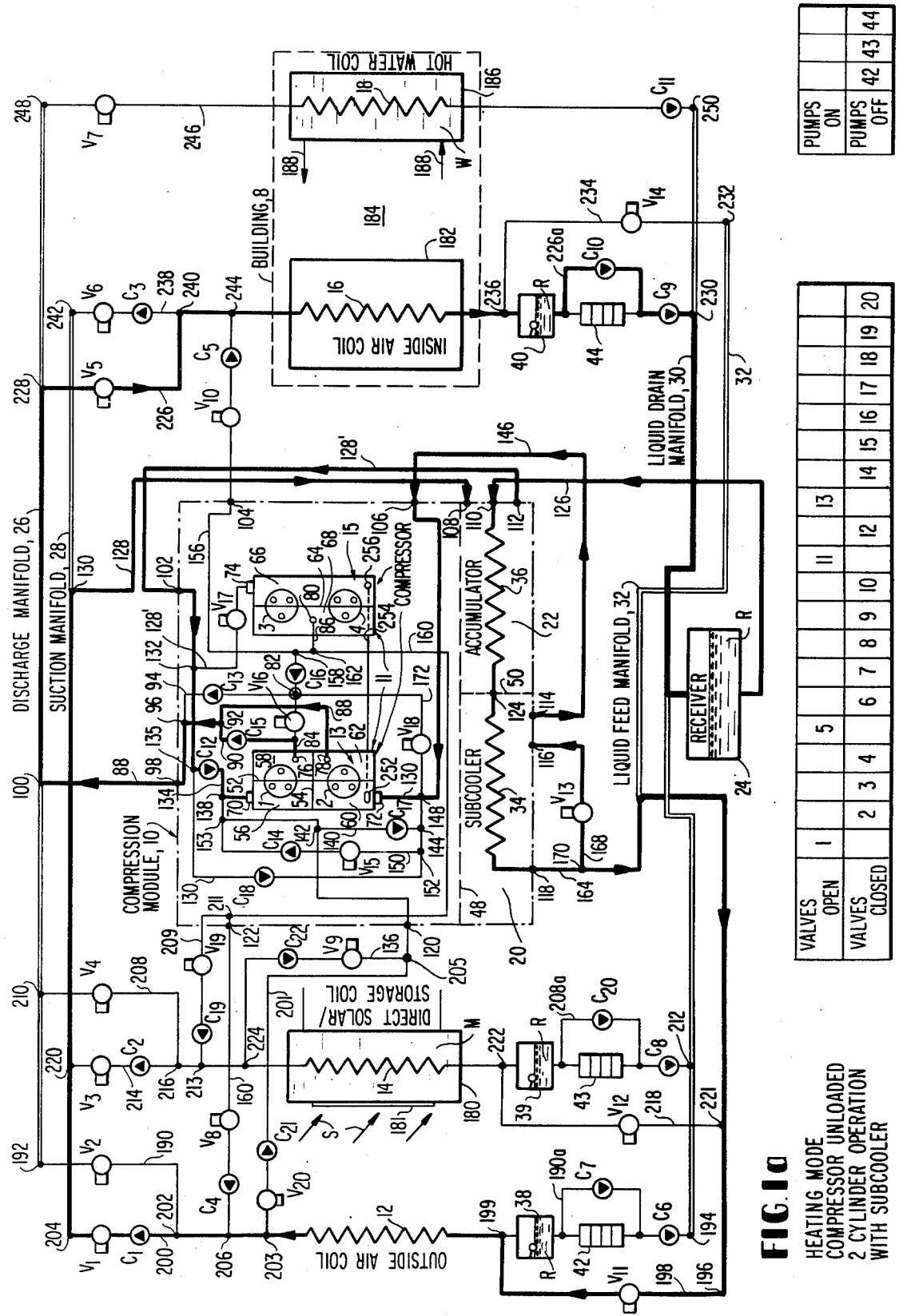

HEATING MODE, DUAL SOURCE
LOW AMBIENT SINGLE STAGE 4 CYL.
OPERATION WITH SUBCOOLING,
HOT WATER HEATING AND AIR AND
STORAGE SOURCE

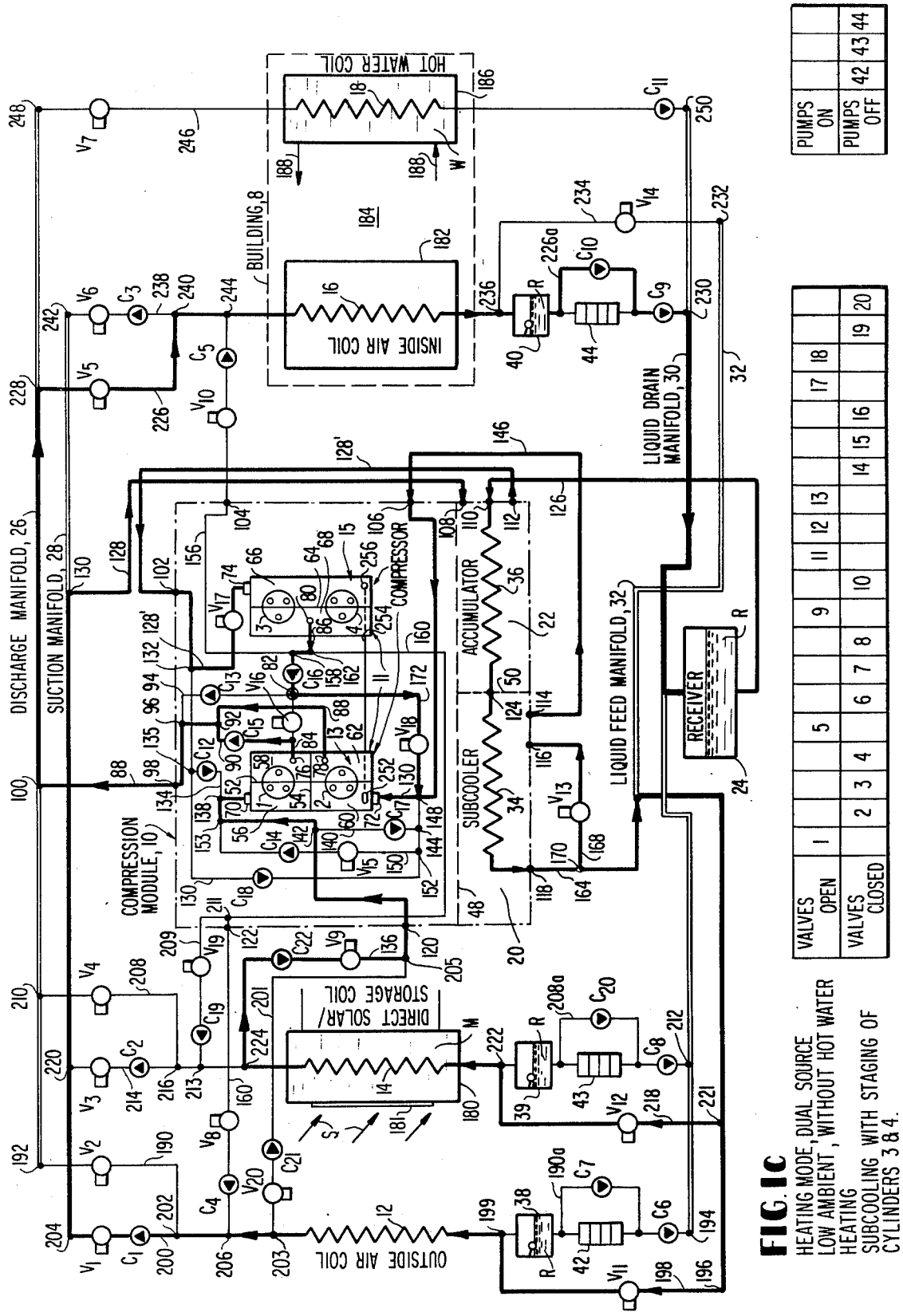
FIG. 1c HEATING MODE, DUAL SOURCE LOW AMBIENT, WITHOUT HOT WATER HEATING SUBCOOLING WITH STAGING OF CYLINDERS 3 & 4.

HEATING MODE
VERY COOL AMBIENT, WITHOUT HOT WATER HEATING
SUBCOOLING WITH STAGING OF CYLINDERS 1,3,4, OUTSIDE AIR SOURCE

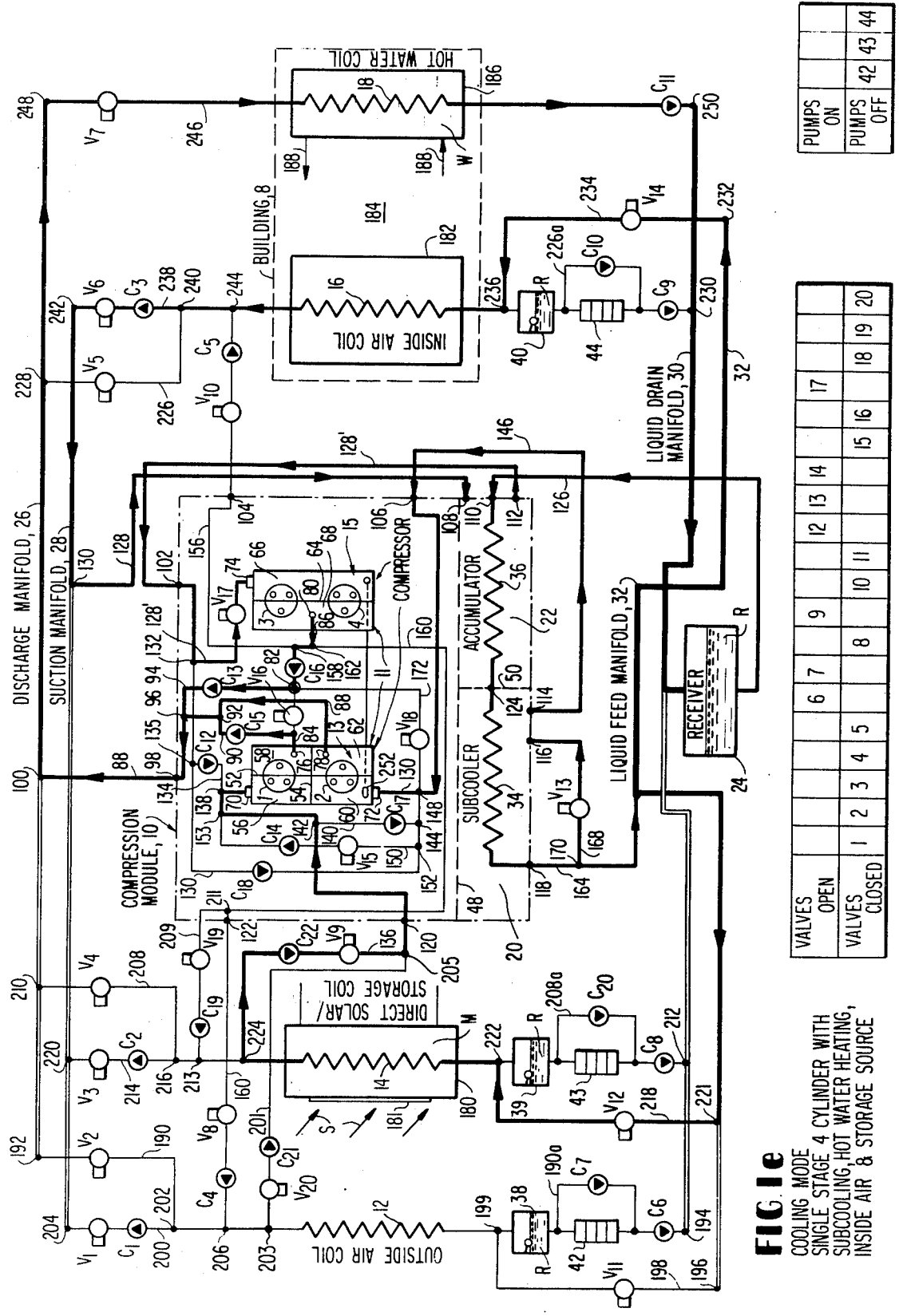

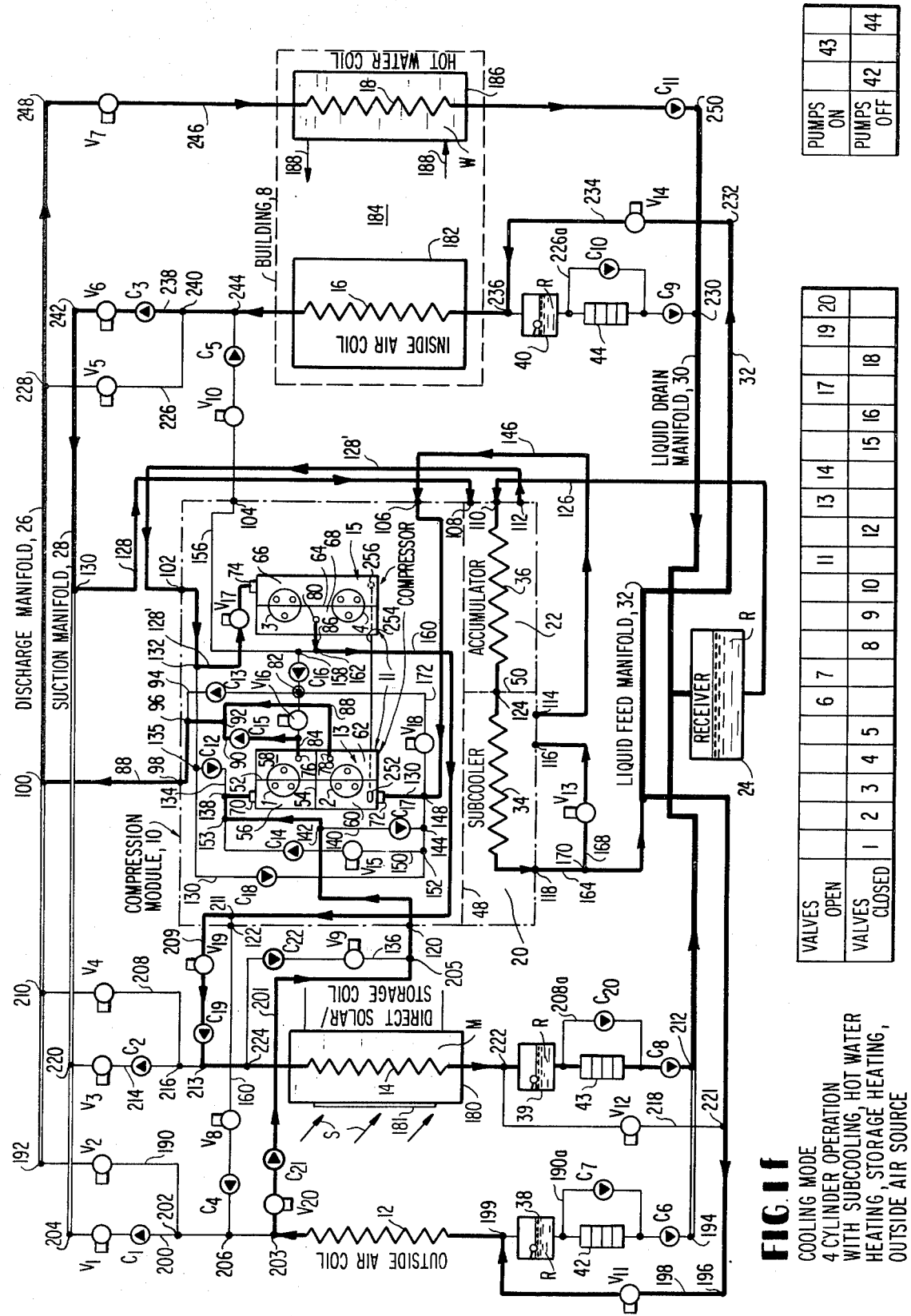

RECIPROCATING COMPRESSOR REFRIGERATION SYSTEM USING STEP EXPANSION AND AUTO STAGING

CROSS REFERENCE TO RELATED APPLICATIONS

This application is a continuation-in-part application of application Ser. No. 924,015 filed July 11, 1978, entitled "INTEGRATED THERMAL SOLAR HEAT PUMP SYSTEM," which application is a continuation-in-part application of application Ser. No. 882,729 filed Mar. 2, 1978, entitled "TRI-LEVEL MULTI-CYLINDER RECIPROCATING COMPRESSOR HEAT PUMP SYSTEM," which application is a continuation-in-part application of application Ser. No. 806,407 filed June 14, 1977, now U.S. Pat. No. 4,148,436, entitled "SOLAR AUGMENTED HEAT PUMP SYSTEM WITH AUTOMATIC STAGING RECIPROCATING COMPRESSORS," which application is a continuation-in-part application of application Ser. No. 782,675 filed Mar. 30, 1977, entitled "AIR SOURCE HEAT PUMP WITH MULTIPLE SLIDE ROTARY SCREW COMPRESSOR/EXPANDER, now U.S. Pat. No. 4,086,072 issuing Apr. 25, 1978, which in turn is a continuation-in-part application of application Ser. No. 653,586 filed Jan. 29, 1976, entitled "HEAT PUMP SYSTEM WITH HIGH EFFICIENCY REVERSIBLE HELICAL SCREW ROTARY COMPRESSOR," now U.S. Pat. No. 4,058,988 issuing Nov. 22, 1977, all assigned to the common assignee.

BACKGROUND OF THE INVENTION

Refrigeration systems, and in particular heat pump systems, selectively heat or cool a space to be conditioned and employ positive displacement refrigerant compressors which may take the form of single or multiple reciprocating pistons, multiple intermeshed helical screws, or other forms of rotary compressors such as the rotary sliding vane, and to a very minor degree, a single rotary screw utilizing rotating guide or sealing members. Such systems pick up heat through a closed refrigerant loop external of a space to be conditioned and supply heat thereto through one coil acting as a system evaporator external of the space and through a second coil which releases that heat to the space being conditioned, and functioning as a condenser.

Alternatively, by reversal of refrigerant flow, heat may be absorbed within the space to be conditioned by employing the second coil as the system evaporator and by discharging that heat external of the space by way of the first coil acting as the system condenser. Additionally, waste heat may be removed from the space being conditioned by an additional coil or coils functioning as system evaporators and that energy may be then supplied to the system or stored for some time by means of a heat storage media thermally insulated from the space to be conditioned, although located within that space. Additional thermal energy may be supplied by solar radiation, and while thermal energy may be picked up external of the space to be conditioned within the atmosphere or from the ground itself, present day technology, particularly in heat pump systems, requires, because of the high cost of fuel or electrical energy to operate the system, control measures to permit automatic system operation at highest system efficiency and by utilization of waste heat available to the system, whereby external solar, air or ground energy may be supplied, dependent upon environment conditions on a day to day basis and, in fact, on an hour to hour basis.

The refrigeration systems, particularly heat pump systems, must be designed so that the system is capable of providing the necessary cooling or heating load to the space or spaces to be conditioned throughout the year, and this causes some difficulty, particularly where there is a large seasonal change. Conventionally, temperature sensors are employed to operate solenoid operated control valves, and the conduits or other refrigerant circulation means between the components of the system involve check valves, reversing valves and the like, to permit system change to meet cooling and heating loads for the same areas or spaces to be conditioned and to incorporate within the system the coils such as the outside air coil, storage coil, inside air coil, direct solar energy supply coil, hot water coil, as needs or system efficiency requirements call for their inclusion. Further, because the system requirements fluctuate greatly even from hour to hour in terms of the need for heating, cooling, dissipation or storage of thermal energy, attempts have been made to provide compressors having variable capacity capabilities and operating efficiently regardless of compressor load conditions as well as the capability of permitting intermediate pressure level return of refrigerant vapor or discharge of refrigerant vapor at intermediate pressure levels with respect to full compressor pressure discharge.

Where the compressor is constituted by a multi-cylinder reciprocating piston compressor, and taking for example a compressor comprised of four cylinders, assuming 100% volumetric efficiency under single stage operation equates to four flow units, at 50% volumetric efficiency the single stage operation result is only equivalent to two flow units. At higher system compression ratios, the reciprocating compressor volumetric efficiency drops to a very low value and a reduction to 25% volumetric efficiency under maximum heating conditions is quite common. In such a case, the result is but one flow unit at the higher compression ratios. Further, in achieving improved system efficiency in contrast to compressor efficiency, it is conventional, particularly in heat pump refrigeration systems, to incorporate a subcooler to subcool the liquid refrigerant downstream of that coil within the system constituting the system condenser and prior to feeding of the same to the coil acting as the evaporator for the system. In such cases, a portion of the high pressure liquid refrigerant which is bled from the system and vaporized to further reduce the temperature of that portion of the refrigerant delivered to the coil functioning as the evaporator for the system under a given particular mode, results in the generation of vapor in the subcooler which is at a pressure which is well above the suction pressure of the reciprocating compressor. As a result, returning the subcooler vapor to the suction side of the reciprocating compressor results in expansion of the refrigerant vapor to meet the pressure of the refrigerant vapor entering the compressor from the downstream or discharge side of the evaporator coil and thereby constituting a system loss reducing the efficiency of the heat pump system or other refrigerant system employing the same.

Further, and particularly in refrigeration systems where one of the evaporators functions to maintain a given space such as a refrigerator cooler at a temperature somewhat above freezing while another evaporator coil functions to maintain a completely separate space such as a freezer locker at a temperature well below freezing, the result is the provision of two different vapor return pressure levels for the compressor, with an intermediate pressure level defined by the higher temperature compartment or space, perhaps being somewhat different from the intermediate pressure level of the subcooler vapor return. On the opposite or high pressure side of the system, particularly under heat pump requirements, the space to be conditioned such as the interior of the building may be supplied heat at a low condensing temperature and therefore by a low pressure condenser with the room being heated by a coil operating at approximately 80° F., while a portion of the refrigerant vapor compressed by the compressor may be delivered to a second, high pressure condenser coil acting as a hot water coil within a hot water tank and maintaining the temperature of that hot water at a level of perhaps 120° F. In that case, these condenser coils comprise discharge loads to the compressor which are distinctly different.

Additionally, and also within heat pump systems where during times of intense solar radiation a solar source evaporator coil may function at a much higher temperature than that of an air source coil, both coils may function to deliver or supply heat to the heat pump system, but with the evaporator return vapors at different low side pressures.

Finally, in the refrigeration system, whether it be a heat pump system or a commercial locker or cold storage plant or the like, there are times when the heating and/or cooling loads are relatively high as against times when they are relatively low. During the winter months, particularly in the northeast states, where the refrigeration system comprises a heat pump system, there are extremely high heating loads and conversely during the summer months there are fairly high refrigeration or cooling loads. To the contrary, during the spring and fall, or even over a 24 hour period particularly during times of intense solar radiation, the compressor may be required only to operate at ¼ its maximum load and the system necessarily must automatically adjust the capacity control of the compressor to system needs regardless of whether the compressor constitutes a reciprocating compressor or a rotary compressor.

It is, therefore, a primary object of the present invention to provide an improved refrigeration system employing a multiple cylinder reciprocating compressor which automatically meets system requirements in terms of load on the compressor while varying pressure level supplies and permitting varying pressure level returns at the low side of the system.

It is a further object of this invention to provide an improved air source heat pump system employing a multiple cylinder reciprocating piston compressor operating at five pressure levels, in which the cylinders are automatically staged and which automatically connect to evaporator coil returns dependent upon those coil operating conditions, while maintaining load reversal on the wrist pins of the reciprocating compressor pistons and connecting rod assemblies dependent upon the highest pressure level of the various refrigerant returns to the compressor.

It is a further object of the present invention to provide an improved refrigeration system employing a modular multiple cylinder reciprocating compressor within the system in the absence of reversing valves and their attendant controls and wherein the compressor may be employed in conjunction with discharge, suction, liquid feed, and liquid drain manifolds common to a plurality of coils which may be connected selectively to either the high side or low side of the compressor and at different pressure levels.

SUMMARY OF THE INVENTION

The invention has application to a refrigeration system such as a heat pump system for conditioning a confined space with the system including a first heat exchange coil within that space, a second heat exchange coil outside of the space, a third heat exchange coil functioning to supply heat to the system or to store heat derived therefrom, and a fourth heat exchange coil functioning as the system high temperature condenser with a compressor for the system and conduit means carrying refrigerant and connecting the coils and the compressor in a closed refrigeration loop circuit with means for selectively causing the coils to function as evaporators or condensers and with the coils functioning depending upon temperature parameters as high pressure condenser, intermediate pressure condenser, low pressure evaporator and intermediate pressure evaporator. There is also a subcooling heat exchange coil for subcooling condensed refrigerant from any coil functioning as the condenser. The improvement resides in the compressor comprising plural cylinder heads, each having paired cylinders, two cylinders of one cylinder head being separated both in terms of low and high pressure sides, while the cylinders of the other cylinder heads are commonly connected on the low and high pressure sides. The conduit means includes a common outlet manifold for the outlet of one cylinder of one head and the common high side of the paired cylinders of the other head with the common outlet manifold being connected to the coil functioning as the high pressure condenser for the system and connected to the low side of the other cylinder of said one head having segregated cylinders, to permit staging of the compressor. The high side common to two cylinders of the other head is selectively connectable to the coil of the system functioning as intermediate pressure condenser. The segregated cylinders of said one head may receive return vapor from the coil functioning as the system intermediate pressure evaporator and the subcooler intermediate pressure vapor return, separately or jointly, and with their high sides discharging commonly to the coil functioning as the system high pressure condenser. Control valve means may be employed to cut off one of the cylinder heads from the refrigerant flow to unload the compressor. Selectively operable control valves function to segregate the cylinder heads, and individual cylinders within said one head from each other, to permit the compressor to operate under multiple pressure levels for respective cylinders.

BRIEF DESCRIPTION OF THE DRAWINGS

FIG. 1a is a schematic diagram of the heat pump system of FIG. 1, operating under heating mode with the compressor unloaded, with subcooler operation, and employing the outside air coil as the heat source.

FIG. 1c is a schematic diagram of the heat pump system of FIG. 1, under heating mode at low ambient without hot water heating, with subcooling and outside air and storage source.

FIG. 1d is a schematic diagram of the heat pump system of FIG. 1, under heating mode under very cold ambient conditions without hot water heating and with subcooler operation, outside air source and with compressor staging.

FIG. 1e is a schematic diagram of the heat pump system of FIG. 1, under cooling mode with single stage compressor operation, subcooling with hot water heating, utilizing storage as an air source.

FIG. 1f is a schematic diagram of the heat pump system of FIG. 1, under cooling mode, single stage compressor operation, with subcooling, hot water and storage heating, with outside air source.

DESCRIPTION OF THE PREFERRED EMBODIMENT

Figure 1:
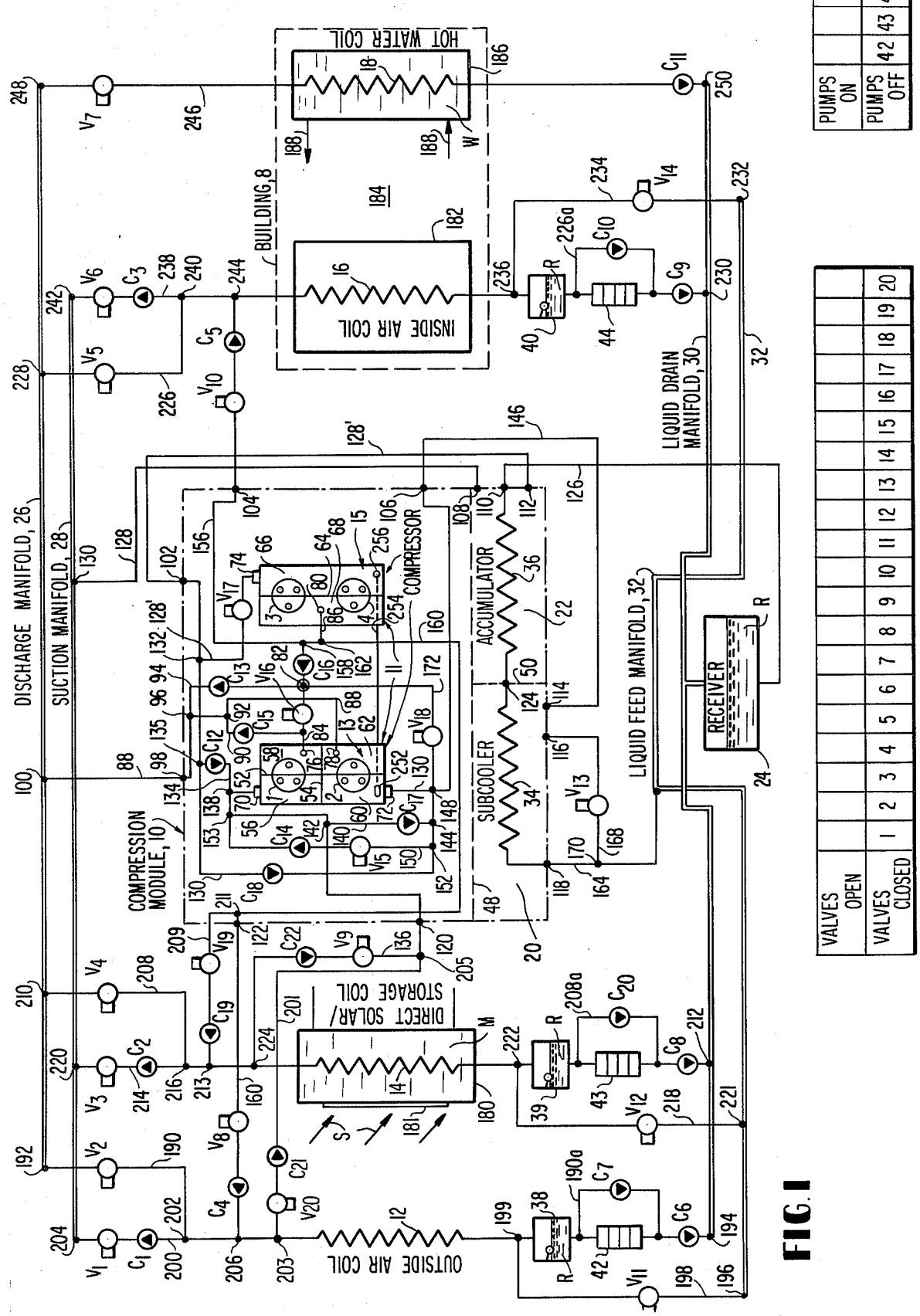
FIG. 1 is a hydraulic schematic diagram of a modular heat pump refrigeration system incorporating a four cylinder reciprocating piston compression module forming one embodiment of the present invention.

Referring first to FIG. 1, there is shown in schematic form one embodiment of the improved refrigeration system of the present invention constituting for illustrative purposes, an air source heat pump system employing as a major component thereof a compression module 10. The compression module 10 includes a four cylinder reciprocating piston compressor indicated generally at 11 comprised of paired cylinder heads, at the left, as at 13, and at the right, as at 15, respectively. Cylinder head 13 comprises cylinders 1 and 2, and cylinder head 15 comprises cylinders 3 and 4. The compression module 10 includes in addition to the compressor 11 a subcooler 20 and an accumulator 22. The subcooler 20 carries a subcooler coil 34, while the accumulator 22 carries an accumulator coil 36, these coils being connected in series. In addition to the compression module 10, the system includes as principal components, a number of heat exchange coils connected with the compressor in closed loop refrigeration circuit fashion including an outside air coil 12, a direct solar/storage coil 14, an inside air coil 16, and a hot water coil 18.

The system is further provided with receiver 24 as a major component. The heat pump system, being of modular construction, additionally adapts to the utilization of multiple coils on both the low pressure and high pressure sides of the system through the utilization of four basic manifolds: a discharge manifold 26, a suction manifold 28, a liquid feed manifold 32, and a liquid drain manifold 30.

In the illustrated embodiment of the invention, there are provided seal pots 38, 39 and 40 for outside air coil 12, direct solar storage coil 14 and inside air coil 16, respectively. Further, for these coils and in order and connected in series with seal pots 38, 39 and 40, are positive displacement pumps 42, 43 and 44 respectively, the pumps being employed selectively to pump to the receiver 24, condensed refrigerant from the system coils functioning as intermediate pressure condensers with the receiver pressure being at the pressure determined by the high pressure condenser for the system at any given time.

Further, the system includes a number of solenoid operated control valves $V_1$ through $V_{20}$ inclusive and check valves $C_1$ through $C_{22}$ inclusive. The solenoid operated control valves are of the normally closed when de-energized type and control refrigerant flow in either liquid or vapor form to and from the coils 12, 14, 16 and 18 as well as compression module components including the subcooler and accumulator coils at 34, 36 repsectively, as well as controlling the flow to and from the individual compressor cylinders 1, 2, 3 and 4. The check valves $C_1$ through $C_{22}$ inclusive function to prevent flow in one direction within the system lines but permit flow in another for the closed loop refrigeration circuit.

Since the applications referred to previously, of which this application is a continuation-in-part, show the utilization of thermal sensors for sensing temperature both interiorly and exteriorly of a building 8 and within the specific environment of coils 12, 14, 16 and 18, as well as the control panel and source of electrical energy for supplying control signals to the various solenoid operated control valves as at $V_1$ through $V_{20}$ inclusive, such means have deliberately been deleted from this application, and it is believed that the componentry and operation of the refrigeration circuit illustrated may be adequately seen under control of such sensors and through such conventional control panels by reference to the tables on the various drawings for the solenoid operated control valves to the left and for the positive displacement pumps to the right at the bottom of the figures.

Turning to the compression module 10 itself, within that compression module, there is indicated two partitions as at 48 and 50, both in dotted lines, and acting to divide the compression module 10 therefore into the three sections, the upper housing the compressor 11 and the lower two defining subcooler 20 and accumulator 22, respectively. Subcooler 20 carries subcooler heat exchange coil 34, while an accumulator heat exchange coil 36 is found within accumulator 22. The reciprocating compressor 11 is constituted by a left cylinder head 13 and a right cylinder head 15, as indicated previously. The left cylinder head 15 includes longitudinal and transverse manifold means 52 and 54 defining a low side 56 and a high side 58 for cylinder 1 and separately therefrom, a low side 60 and a high side 62 for cylinder 2. The right cylinder head 15 employs a single longitudinal manifold means 64 to define commonly for both cylinders 3 and 4 a low side 66 and a high side 68. The terms "low side" and "high side" define the relative pressure levels of the compressor head, the low side indicating the suction side and the high side the discharge side for given cylinders or pairs of cylinders. A first compressor inlet 70 is provided for cylinder 1 within cylinder head 13, and a second compressor inlet 72 is provided for cylinder 2 of left cylinder head 13. A third compressor inlet 74 is provided to the right cylinder head, which opens commonly to cylinders 3 and 4 at low side 66 thereof. Cylinder 1 is provided with an outlet or discharge port as at 76 which lies within high side 58 of that cylinder and is separate from outlet or discharge port 78 for cylinder 2 within high side 62. A common outlet or discharge port 80 is provided within the high side 68 of the right cylinder head 15. The compressor is provided with a common outlet manifold as at 82, this common outlet manifold 82 being connected to the outlet 76 for cylinder 1 by way of conduit or line 84, the common outlet manifold 82 also being connected by way of line 86 to the outlet or discharge port 80 of cylinder head 15. The outlet or discharge port 78 for cylinder 2 within high side 62 of the left cylinder head 13 does not discharge to the common outlet manifold 82 but rather by way of a separate line 88 connects directly the discharge manifold 26. A bypass line is provided at 90 which connects to line 84 upstream of solenoid operated control valve $V_{16}$ and connects to line 88 at point 92, line 90 bearing a check valve $C_{15}$ which permits flow from the high side or discharge of cylinder 1 to the discharge manifold 88 without going through the common outlet manifold 82 when the solenoid operated control valve $V_{16}$ is de-energized and closed, but prevents flow from the discharge side of cylinder 2 from passing back to the high side 58 of cylinder 1. Therefore, cylinders 1 and 2 can discharge in parallel and commonly to the discharge manifold 26 through line 88. Line 94 connects the common outlet manifold 82 to line 88 at point 96, thereby permitting the discharge of cylinders 3 and 4 to flow to the discharge manifold 26 under single stage four cylinder operation, this flow passing through check valve $C_{16}$ within line 86 and check valve $C_{13}$ within line 94. Line 88 exits from the compressor module 10 at point 98 and connects to the discharge manifold 26 at point 100. The compression module 10 further includes in terms of the refrigerant circuit a number of terminal or connection points between elements internal of the compression module 10 and those exterior, these terminal points are in addition to point 98, points 102, 104, 106, 108, 110, 112, 114, 116, 118, 120, 122; in a clockwise direction from point 98, for the compressor 11 and for the accumulator 22 and subcooler 20, while internally, between the subcooler and the accumulator there is a terminal point or connection 124 for the line 126 bearing the subcooler and accumulator coils 34 and 36, respectively. The low pressure return or suction manifold line 128 to the compressor connects to the suction manifold at point 130 and opens to the interior of the accumulator 22 at terminal 108. Further, terminal 112 provides a vapor return connection via line 128' to point 102, the line 128' being connected to inlet 74 of the right cylinder head 15 and bearing solenoid operated control valve $V_{17}$. Additionally, low pressure vapor returns to the suction side of the compressor through line 130 which connects to line 128' at point 132, this line passing to inlet 72 opening to the low side 60 of the left cylinder head 13 and to the suction port for cylinder 2. A branch line 134 connected to line 130 at connection point 135 connects to inlet 70 for cylinder 1 and low side 56, that line including check valve $C_{12}$ further permitting flow from the suction manifold to that cylinder in the same manner that check valve $C_{18}$ within line 130 permits flow from the suction manifold 28 to inlet 72, assuming that there is no intermediate level pressure vapor available to that cylinder.

Intermediate pressure refrigerant vapor return to the compressor 11 is effected by way of terminal 120 and a line 136 which is permitted to pass to the inlet 70 for cylinder 1 upon energization of solenoid operated control valve $V_9$, when the direct solar coil 14 is functioning as an intermediate pressure evaporator and heat is being provided by that coil to the system. Line 136 connects to line 134 at point 138 to accomplish this result. Further, a branch line 140 connects to line 136 at point 142 and to line 130 at point 144 to permit intermediate pressure refrigerant vapor to return to cylinder 2 by passage through check valve $C_{17}$ within that line. The presence of check valve $C_{12}$ prevents flow towards the suction manifold of the higher intermediate pressure vapor returning through line 136 to the compression module 10. A second source of intermediate pressure level refrigerant vapor is terminal 106 of the compression module 10 for line 146 which connects to line 130 at point 148 such that the intermediate pressure level refrigerant vapor from the subcooler 20 may return to the compressor but not to suction manifold 28 through line 130 due to check valve $C_{18}$. Line 146 opens to the subcooler at port 114 for that section of the compression module 10. This vapor cannot pass to cylinder 1 due to the presence of check valve $C_{17}$ within line 140. A line 150 is provided between line 130 and line 136 opening to those lines at connection points 152 and 153 respectively, this line bearing a solenoid operated control valve $V_{15}$ to permit regardless of the state of energization of solenoid operated control valve $V_9$ within line 136, flow of intermediate pressure return refrigerant vapor from the subcooler coil 36 to cylinder 1, this return being unrestricted with respect to cylinder 2 via line 130.

In addition to staging of the compressor cylinders, the compressor itself has the capability of delivering compressed refrigerant vapor at a pressure intermediate of the suction and discharge levels when under staged operation. In that respect, a line 156 connects to line 86 upstream of check valve $C_{16}$ at point 158 and the common outlet manifold 82 and exits from the compression module 10 at terminal 104 for delivering in this case, intermediate pressure vapor to the inside air coil 16 under operation of a suitable solenoid operated control valve $V_{10}$ and check valve $C_5$ in series therewith. The control valve $V_{10}$ and check valve $C_5$ may be incorporated within the compression module 10, although it is shown intermediate of that module and the inside air coil 16. Additionally, a line 160 which connects to line 86 for the common discharge for cylinders 3 and 4 of the right cylinder head 15 at 162 exits from the compression module 10 at terminal 122 and permits the supply of refrigeant vapor at intermediate pressure from the compressor to the outside air coil 12 and direct solar/storage coil 14 when either coil is functioning as a low pressure condenser. Line 160 bears a check valve $C_4$ and solenoid operated control valve $V_8$ to prevent reverse flow within that line from outside air coil 12 to effect flow in the proper direction by energization of solenoid operated control valve $V_8$, respectively.

In conventional function, the accumulator acts to insure delivery of refrigerant vapor to the compressor cylinders for compression, and in that regard the low pressure return vapor via suction manifold 28 to the compressor cylinders is passed by line 128 to the accumulator, entering through terminal point 106 to that section, where the refrigerant vapor exchanges heat, picking up thermal energy from the liquid refrigerant passing between terminal or connection points 110 and 124 of accumulator coil 36, the liquid refrigerant from the receiver 24 passing to the accumulator via conduit or line 126. The vapor which is thereby heated exits from the accumulator at terminal pont 112 and passes by way of line 128' to given inlets of the compressor heads 13 and 15. The liquid refrigerant is further subcooled within subcooler coil 34. In this regard, within line 165 leading from the subcooler at terminal point 118 to the liquid feed manifold 32 at connection point 166, there is provided a bleed line 168, which connects to line 164 at point 170 and which terminates at terminal point 116 opening to the interior of the subcooler to deliver liquid refrigerant which vaporizes at this point subcooling the liquid within coil 34. This controlled operation is achieved by energization of solenoid operated control valve $V_{13}$. The vapor returns to the compressor via subcooler return line 146 as stated previously which connects to line 130 at point 148; line 146 opening to the interior of the subcooler at point 114.

As stated previously, the four cylinder compressor is capable of staged operation by either utilizing cylinder 2 alone or cylinders 1 and 2 in parallel as the second stage of compression. This is effected by way of a line 172 which leads from the common outlet manifold 82 to connection point 148 with line 130 upstream of the inlet 72 and opening to the low side 60 of cylinder 2. A solenoid operated control valve $V_{18}$ is positioned within line 172 such that when this valve is energized, the discharge of cylinders 3 and 4 exits from the common outlet manifold 82, and passes to the suction or low side 60 of cylinder 2 for the left cylinder head 13. The second stage vapor discharges at high pressure from cylinder head 13 at high side 62 of cylinder 2 through line 88 which connects directly to the discharge manifold 26. Under single cylinder automatic staged operation, solenoid operated control valve $V_{16}$ is energized to connect the high side or outlet 76 of cylinder 1 to the common outlet manifold 82, such that the common outlet manifold 82 receives the discharge from cylinders 1, 3 and 4 after initial compression and passes the partially compressed vapor to cylinder 2 for additional second stage compression. By energization of solenoid operated control valve $V_{18}$, this first stage compressor discharge is compressed by cylinder 2 to a higher pressure, whereas the high side 62 feeds to the discharge manifold 26 through line 88.

If cylinder 2 is incapable of providing the desired flow requirements at this pressure level, solenoid operated control valve $V_{15}$ is energized and line 150 opens to permit high pressure flow through check valve $C_{14}$ to line 134 leading to inlet 70 for cylinder 1, in this case the discharge from cylinder 1 passes by way of line 90 and check valve $C_{15}$ to the line 88, it being necessary to simultaneously de-energize solenoid operated control valve $V_{16}$ to take cylinder 1 off the line with respect to the common outlet manifold 82.

Solenoid operated control valve $V_{17}$ within line 128' is provided principally to permit unloading of the compressor by simply shutting off the flow of suction gas to the common low side 66 for cylinders 3 and 4 of cylinder head 15.

As indicated previously, the subject invention is particularly applicable to modular refrigeration systems in which various coils may be coupled to suction and discharge manifolds and liquid drain and liquid feed manifolds with check valves and control valves, preferably automatically solenoid operated, to selectively operate given coils as condensers or evaporators, depending upon system needs and the availability of energy for the system or the necessity for its rejection as waste heat which is, of course, dependent largely on seaonal load variation in the case of heat pumps. In that respect, the refrigerant R, as indicated in liquid form within the bottom of receiver 24, may be Freon such as R12 and circulated through the system. Under the realization that the highest pressure refrigerant in vapor form discharges from the compression module 10 through line 88 to the discharge manifold 26, manifold 26 is connected to one side of outside air coil 12, direct solar coil 14, inside air coil 16, and hot water coil 18, with the same side of coils 12, 14, and 16 being additionally connected to the suction manifold 28. Coil 18 is purposely not connected to the suction manifold 28 so that coil 18 can function only as a condenser and not as an evaporator. The outside air coil 12 simply sets in the ambient, that is, in contact with the outside air, and air may flow over the coil 12 under forced air operation, such as by way of a fan or blower (not shown). The direct solar storage coil 14 is immersed within a liquid media M carried by an insulated tank 180, one side of which is provided with a transparent window 181, permitting the rays of the sun indicated at S to impinge directly on the media and thus warm to same. A cover or shade (not shown) may be provided to window 181 for preventing selectively, such radiation. Obviously, the media M may be heated by the sun indirectly by circulation with a heat exchange coil functioning as a solar collector under thermal siphonic, or forced liquid movement through tank 180. The coil 14, when functioning as a condenser, heats the media M, and the tank 180 therefore functions as a thermal energy storage tank by receiving waste heat from the loop as for instance when cooling the interior of building 8 by use of the inside air coil 16. The inside air coil 16 is shown within a casing 182 constituting a heat exchanger interiorly of the building and within space 184. Additionally, the building may carry a hot water tank as at 186 thermally insulated and bearing water W which is heated, coil 18 always functioning as a condenser and receiving refrigerant vapor discharged from the compressor 11. Water lines 188 permit removal of hot water as desired for building needs, and the supply of fresh water to be heated.

The discharge manifold 26 is connected to the outside air coil 12 by way of line 190 at 192, that line carrying the solenoid operated control valve $V_2$, and in addition, the seal pot 38 acting to collect refrigerant R when the outside air coil 12 is functioning as a condenser, this refrigerant in liquid form being pumped by way of positive displacement pump 42 to receiver R through the liquid drain manifold 30, line 190 connecting to the liquid drain manifold 30 at point 194. A bypass line 190a bypasses pump 42 and includes check valves $C_7$, whle the line 190 also includes check valve $C_6$ between point 194 and the connection of bypass line 190a. In order to permit the outside air coil to function as an evaporator and to supply heat to the system, the liquid feed manifold 32 connects at point 196 to line 198 which line includes solenoid operated control valve $V_{11}$ and which connects to line 190 to one side of the outside air coil 12 at 199. On the opposite side of that coil, there is provided a line 200 which connects at point 202 to line 190 on the opposite side of the outside air coil 12, and connects to the suction manifold 28 at point 204 acting as a return for refrigerant which is vaporized within the outside air coil 12 when that coil functions as a low pressure evaporator, the vapor returning through solenoid operated control valve $V_1$ and check valve $C_1$, permitting flow to the suction manifold but preventing flow in the opposite direction. Line 201 bearing solenoid operated control valve $V_{20}$ and check valve $C_{21}$ connects to line 200 at 203 and line 136 at 205, permitting selectively, intermediate pressure vapor return to the compressor. All seal pots, such as seal pot 38 bear a float controlling operation of underlying pumps, as at 42 upon accumulation of liquid refrigerant to float level. The pumps cycle on and off.

The outside air coil may operate as an intermediate pressure condenser, in which case it receives vapor from the compressor 11 through line 160 which opens at point 162 to the line 86 leading from the high side 68 of the compressor right cylinder head 15 to the common outlet manifold 82, the line 160 connecting to line 190 bearing the outside air coil at point 206. Line 160 includes solenoid operated control valve $V_8$ to permit flow to the outside air coil when functioning as an intermediate pressure level condenser, but prevents reverse flow by way of check valve $C_4$ in series therewith, that is, from the line 190 back to the high side 68 for compressor cylinders 3 and 4.

Turning to the direct solar/storage coil 14, that coil is connected to the discharge manifold 26 by way of line 208 which connects to the discharge manifold at point 210, line 208 connects to the liquid drain manifold 30 at point 212 and bears solenoid operated control valve $V_4$ for feeding high pressure compressor discharge refrigerant vapor to the coil 14 when that coil functions as a high pressure condenser to supply heat to the media M within tank 180. Alternatively, the coil 14 may function as an intermediate pressure condenser, receiving vapor from line 160 via line 209 connected at 211 to line 1760 and at 213 to line 208. Line 209 carries in series, check valve $C_{19}$ and solenoid operated control valve $V_{19}$. Further, coil 14 may function as an evaporator coil and remove heat from the media M as provided by the solar rays S, in this case the coil 14 connects to the suction manifold 28 through line 214 which connects to line 208 at point 216 at one end and to the suction manifold 28 at point 220 on the other end. Line 214 carries the solenoid operated control valve $V_3$ which, when energized, permits vaporized refrigerant vapor to return to the compressor via the accumulator, this vapor passing through check valve $C_2$.

Under circumstances where coil 14 is functioning as an evaporator, it receives its liquid refrigerant from the liquid feed manifold 32 through line 218 which connects to the liquid feed manifold 32 at point 221 and to line 208 at point 222 between the seal pot 39 and the coil 14. The line 208 includes the seal pot 39 and also a positive displacement pump 43 and check valve $C_8$ so that whenever coil 14 functions as the low pressure condenser for the system, its condensed refrigerant can be fed back to the receiver 24 by positive pump operation. However, when the pump 43 is not needed, the bypass line 208a which bypasses the pump 43 and bears check valve $C_{20}$ permits the flow of refrigerant at condenser pressure from coil 14 to the receiver 24.

Further, the direct solar coil 14 may be functioning as the system intermediate pressure evaporator. In that case, refrigerant vapor at intermediate pressure is returned to the compressor through line 136 which connects to line 208 at point 224, enters the compression module 10 at terminal 120 and connects to line 134 at connection point 138. The intermediate pressure refrigerant vapor first flows to compressor cylinder 1 and secondly if needed, passes through check valve $C_{17}$ within line 140 to port 144, thence through line 130 to the inlet 72 of cylinder 2 so that both cylinders 1 and 2 may be compressing vapor at an intermediate pressure level defined by coil 14 rather than the pressure defined by subcooler coil 34.

Turning to the inside air coil 16, this coil functions primarily to heat and cool the interior space 184 of building 8 to be conditioned. In this respect, the discharge manifold 26 is connected to coil 16 via line 226 at 228, the line 226 connecting, at the opposite side of coil 16 to the liquid drain manifold 30 at point 230. Within line 226, in addition to coil 16, is the solenoid operated control valve $V_5$ which when energized and open, causes the high pressure refrigerant vapor to flow to the coil 16 which functions as a high pressure condenser, the condensed refrigerant entering seal pot 40 and flowing through positive displacement pump 44, if necessary, and check valve $C_9$ to the liquid drain manifold 30. Line 226 includes bypass line 226a bearing check valve $C_{10}$ and permitting flow about the positive displacement pump 44 without its energization, should the inside air coil 16 function as the high pressure condenser or at least at a condensing pressure equal to the other coils within the system functioning as condensers at that moment. The liquid feed manifold 32 is connected at point 232 to a line 234 bearing solenoid operated control valve $V_{14}$ and being connected to line 226 at 236 valve $V_{14}$, when energized, permitting high pressure condensed refrigerant to feed from the receiver 24 to the inside air coil 16 when it functions as an evaporator, with the vaporized refrigerant returning to the compressor 11 by either of two flow paths. The first is to the suction manifold 28 via line 238 which is connected at point 240 to line 226 on the same side of coil 16 as the discharge manifold, and by way of point 242 to suction manifold 28, line 238 including check valve $C_3$ and solenoid operated control valve $V_6$, this permitting the coil to be essentially at suction pressure. Secondly coil 16 may return to line 136 by means (not shown) when acting as an intermediate pressure evaporator.

The inside air coil 16 may function as an intermediate pressure condenser and receive compressed vapor, particularly when the compressor is staged, via line 156 which connects at point 158 with line 86, exits from the compression module 10 at terminal point 104 and terminates at point 244 where it connects to the line 226 leading to the inside air coil 16. Line 156 includes solenoid operated control valve $V_{10}$ and check valve $C_5$ permitting flow through this line from the compressor to the inside coil but not in the opposite direction. When valve $V_{10}$ is open, solenoid operated control valve $V_5$ is closed, and the inside air coil 16 operates at intermediate condensing pressure.

With respect to the hot water coil 18, this coil is connected only between the discharge manifold 26 and the liquid drain manifold 30 via line 246 at connection points 248 and 250 respectively. Line 246 includes solenoid operated control valve $V_7$ and check valve $C_{11}$. Refrigerant can flow to the coil 18 functioning always as a condenser only when the solenoid operated control valve $V_7$ is open and check valve $C_{11}$ prevents the reverse flow. Since coils 12, 14 and 16 function as evaporator coils, in which case it will be necessary to provide a restriction or other pressure reducing means (not shown) such as an expansion valve in the lines to permit the high pressure liquid refrigerant directed to these coils to expand, when functioning as evaporators, from the receiver 24 through the liquid feed manifold 30. However, such means are conventional and the drawing does not include the same to simplify the illustration of the heat pump system to which the present invention has application in one form.

In order that the crank case be pressured at the highest level of the intermediate pressure returns to the compressor for proper wrist pin load reversal for all cylinders a port 252 is provided within the left cylinder head 13 which permits the pressure within the low side 60 of that cylinder head to reach the underlying crank case common to both cylinders 1 and 2. Additionally, a conduit or line 254 extends from the crank case of left cylinder head 13 to the right cylinder head 15 terminating as at 256 so as to insure pressurization of the crank case or its portion underlying cylinders 3 and 4 at the pressure prevailing within the low side 60 of cylinder 2. Thus, if the subcooler pressure is higher than the intermediate pressure return through line 136 as from coil 14, the crank case for both heads is at the subcooler pressure. If instead the pressure of line 136 normally returning to the cylinder is higher than the subcooler return line 136, check valve $C_{17}$ will open, the low side 60 of cylinder 2 will be at the higher pressure as will the crank cases or common crank case for all four cylinders.

The operation of the modular system of the present invention and the multiple cylinder automatically staged reciprocating compressor 11 may be fully appreciated by references to FIGS. 1a–1f inclusive showing the various modes of operation and the utilization of the various coils and selective operation of the compressor at selected ones of the five different pressure levels in conjunction with the coils which are connected to the compressor module by way of the four basic common manifolds.

The operation of the modular heat pump refrigeration system in a simple heating mode utilizes the heat of the outside air for heating the building interior or space 184 by employing the outside air coil 12 as the system evaporator and the inside air coil 16 as the system condenser. In that respect, in FIG. 1a, conditions are such that the temperature of the outside air is higher than the temperature of the media M within tank 186 within the direct solar storage tank, and the water W of the hot water tank 186 is sufficiently hot so that no heat input is required to that tank. Under such conditions, the system may operate with either two cylinders or four cylinders supplying supplying compressed refrigerant to the inside air coil 16 acting as the condenser and with the compressor essentially unloaded. Under full unload condition, cylinders 3 and 4 are cut off to the suction manifold 28 and cylinders 1 and 2 are open to the suction manifold 28 and the intermediate pressure refrigerant return from subcooler 20, respectively. In fact, the system would act to draw the subcooler return line down to the suction pressure of manifold 28.

With respect to the schematic diagram of FIG. 1a, solenoid operated control valves $V_1$, $V_5$, $V_{11}$, and $V_{13}$ are energized and open while solenoid operated control valves $V_2$ to $V_4$ inclusive $V_6$ through $V_{10}$ inclusive, $V_{12}$ and $V_{14}$ through $V_{20}$ inclusive are de-energized and closed. Additionally, pumps 42, 43 and 44 are all off. Compressed refrigerant vapor discharges from the compressor 11 through line 88 and flows through the open solenoid control valve $V_5$ to the inside coil 16 acting as a condenser, the condensed refrigerant within seal pot 39 flowing to the bypass line 226a and check valve $C_{10}$ as well as check valve $C_9$ to the liquid drain manifold 30 where it passes to receiver 24. The liquid refrigerant flows to the accumulator coil 36 and subcooler 34 through line 126 for subcooling. With solenoid operated control valve $V_{13}$ open, a portion of the liquid refrigerant is bled downstream of the subcooler and returned to the subcooler 20 through line 168 for vaporization, the vapor returning to the compressor at intermediate pressure through subcooler return line 146 which connects to line 130 at connection point 148, where it is directed to the inlet 72 to cylinder 2. The subcooled refrigerant liquid within the liquid feed manifold 32 feeds to the inside air coil 12 functioning as a system evaporator by energization of solenoid operated control valve $V_{11}$ where the latent heat of vaporization of that liquid absorbs heat from the outside air prior to returning to the suction side of the compressor and specifically discharge manifold 26 through line 200, check valve $C_1$ and solenoid operated control valve $V_1$. Prior to entering the compressor, however, this vapor is directed to the accumulator 22 where it functions to provide partial subcooling to the liquid refrigerant within coil 36, while at the same time the accumulator 22 insures the vaporization of any liquid refrigerant tending to pass from suction manifold 28 to the compressor cylinders, the vaporized refrigerant leaving the accumulator through line 128' and passing to inlet 70 of cylinder 1 and entering low side 56 of cylinder head 13, through lines 130 and 134. Cylinders 1 and 2 discharge in parallel; cylinder 2 discharging from the high side 62 at outlet 48 and through line 88 to the discharge manifold 26. Cylinder 1 discharges from its high side 58 through outlet 76 and lines 84 and 90, line 90 joining line 88 at connection 92 downstream of check valve $C_{15}$. In this operation, which is where the heating requirements are low and the outside ambient temperature is fairly high, the compressor may operate unloaded with cylinders 3 and 4 cut off from suction by de-energization of solenoid operated control valve $V_{17}$, as shown. Solenoid operated control valve $V_{16}$ is also de-energized, and the discharge from cylinder 1 is forced to flow through line 90 in parallel with line 88 to the discharge manifold 26. While the present invention contemplates the use of the subcooler 20 under all conditions and as such, solenoid operated control valve $V_{13}$ is always energized and open, there is essentially little subcooling, and the subcooler return line 146 is pulled down to the suction pressure of suction manifold 28 supplying refrigerant to cylinder 1. The intermediate pressure return vapor within line 146 being higher than the suction pressure of suction manifold 28 prevents the flow of refrigerant vapor from the suction manifold 28 to cylinder 2 and the presence of check valves $C_{17}$ and $C_{18}$ as well as the de-energization of solenoid operated control valve $V_{15}$ prevents flow of subcooler vapor to cylinder 1. As the heating load increases, the system is designed such that automatically in response to temperature drop within the building interior or space 184, solenoid operated control valve $V_{17}$ opens so that refrigerant flow from the suction manifold 28 may flow through line 128' to inlet 74 common to both cylinders 3 and 4 and low side 66 of cylinder head 15. Compressed refrigerant discharges from cylinders 3 and 4 through outlet 80 and passes to the common outlet manifold 82 through check valve $C_{16}$, and thence to line 94 and through check valve $C_{13}$ to line 88 leading to the discharge manifold 26, commonly with the discharge of cylinders 1 and 2. Operation without subcooler under this mode is possible.

Figure 1B:
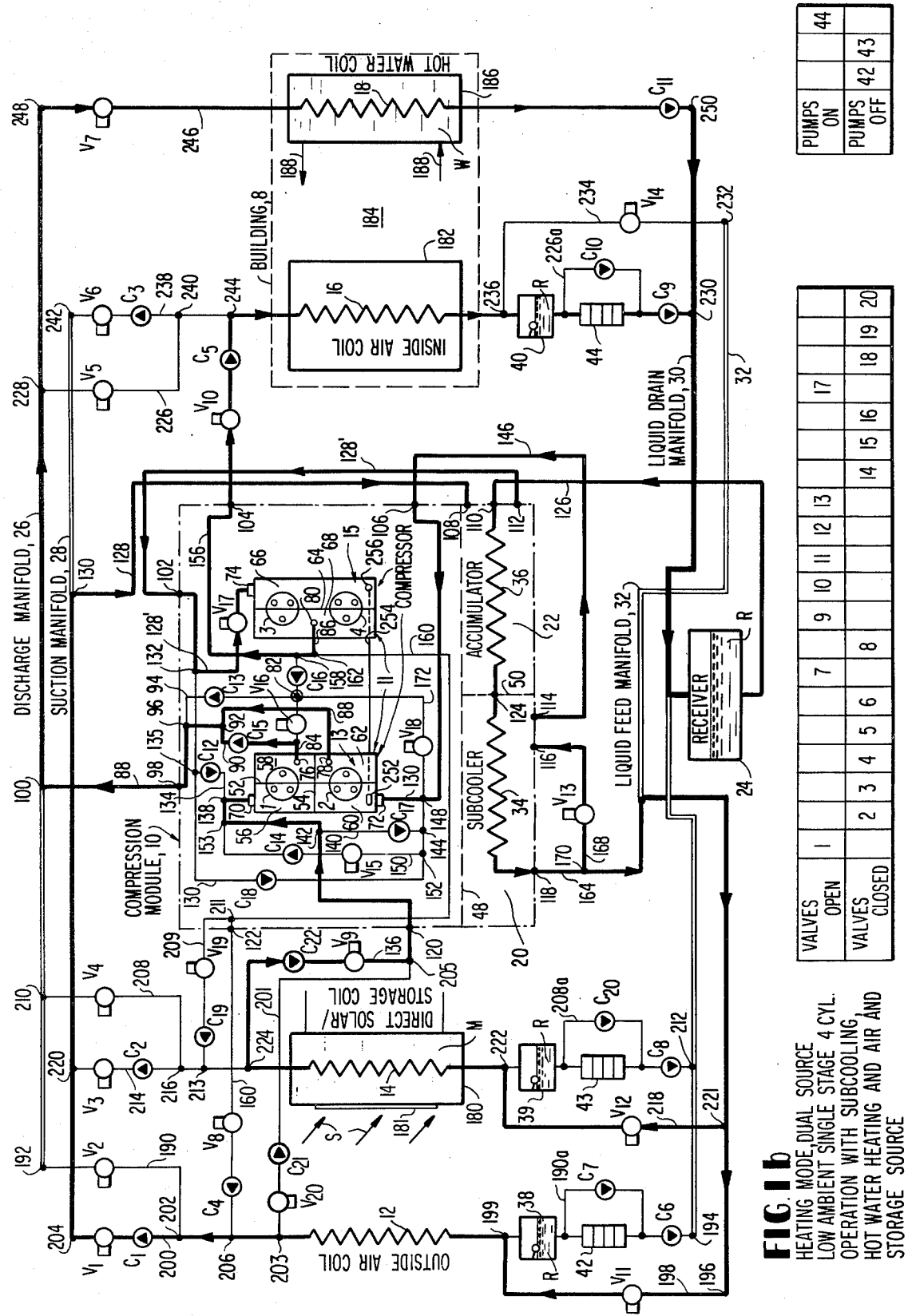
FIG. 1b is a schematic diagram of the heat pump system of FIG. 1, under heating mode at low ambient with the compressor under single stage operation with subcooling, hot water heating and combined air and storage source.
Figure 10:
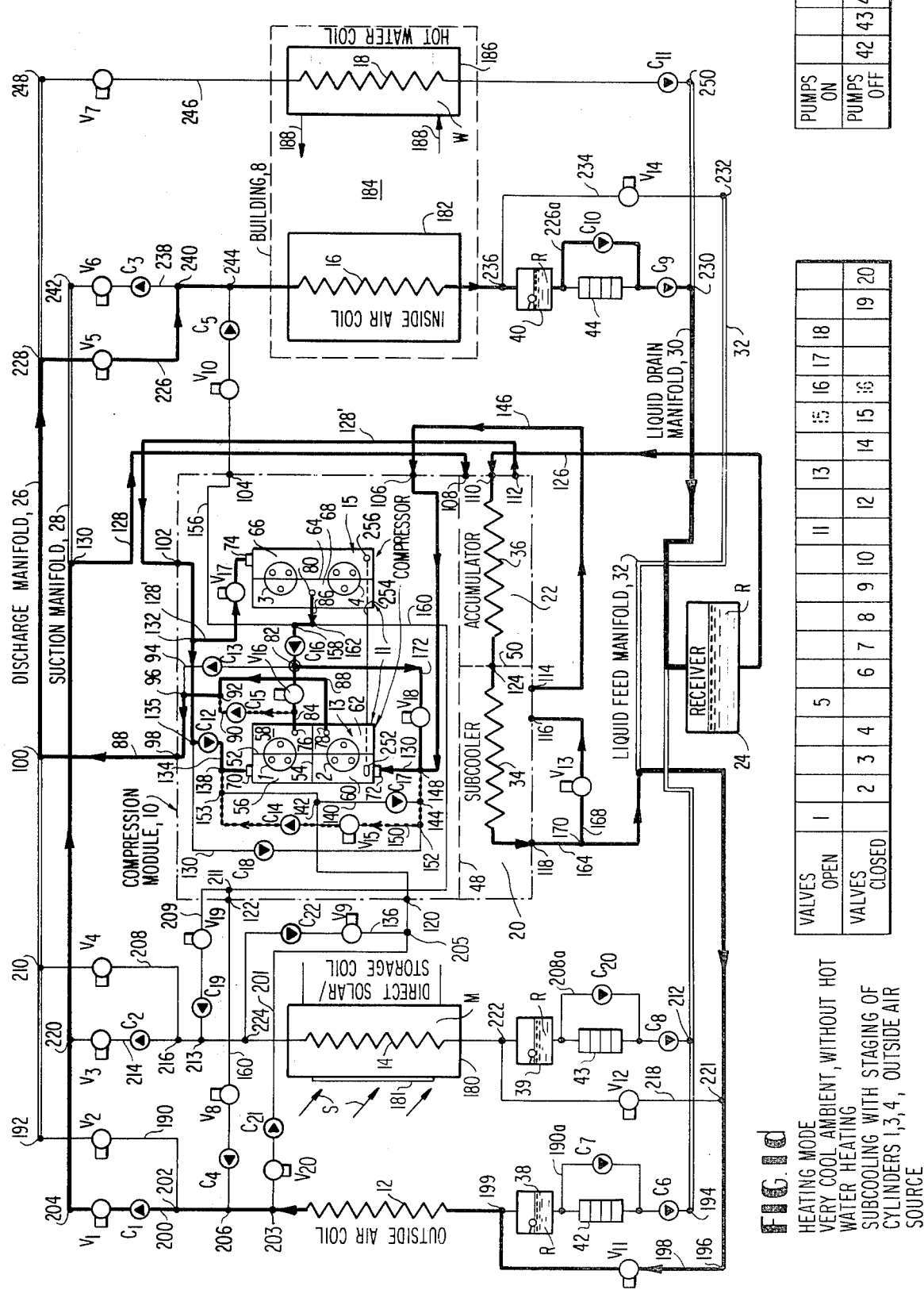

Referring next to FIG. 1b, this figure represents the system under a heating mode when the temperature of the ambient or outside air has reduced, that is, under low ambient conditions and where the compressor is operating in single stage with all four cylinders.

As mentioned previously, under all conditions subcooling is employed, and in this case, heat is supplied both by the outside air coil 12 and by the direct solar/storage coil 14, coil 14 extracting heat from the storage media M of tank 186, the heat not only being required to heat the building interior or space 184 but also to heat the water W within hot water tank 186, with coils 16 and 18 functioning as condensers for the system. Solenoid operated control valves $V_1$, $V_7$, $V_9$, $V_{10}$, $V_{11}$, $V_{12}$, $V_{13}$ and $V_{17}$ are energized and open, while solenoid operated control valves $V_2$ through $V_6$ inclusive, $V_8$, $V_{14}$, $V_{15}$, $V_{16}$, $V_{18}$, $V_{19}$ and $V_{20}$ are de-energized and closed. Further, pumps 42 and 43 are de-energized or off, while pump 44 is energized or on.

High pressure compressed refrigerant is available from the discharge manifold 26 for heating the water W within tank 186 with coil 18 functioning as the high pressure condenser for the system upon energization of solenoid operated control valve $V_7$. The condensed refrigerant passes to the receiver 24 where it then passes through line 126 to the accumulator and subcooler for subcooling within coils 36 of the accumulator and 34 of the subcooler. Subcooler vapor created by bled refrigerant through solenoid operated control valve $V_{13}$ to the subcooler returns through line 146 to the compressor 11 and is delivered to inlet 72 for cylinder 2 as intermediate pressure refrigerant vapor. High pressure condensed refrigerant is available from the liquid feed manifold 32 for both the outside air coil 12 and the direct solar/storage coil 14, with the outside air coil operating, for instance, at 30° F. saturation temperature. Vapor from the outside air coil returns to the compressor via suction manifold 28, through line 220 with solenoid operated control valve $V_1$ energized. The vapor within the suction manifold passes first to the accumulator 22 to insure that the refrigerant is fully vaporized prior to returning to the compressor and specifically cylinders 3 and 4 through line 128' upon energization of solenoid operated control valve $V_{17}$, entering the low side 66 of cylinder head 15 at inlet 74.

Additionally, the heat is being extracted from the media M within tank 186 by heat exchange with the refrigerant carried by the direct solar/storage coil 14 upon energization of solenoid operated control valve $V_{12}$, with the refrigerant flowing from the liquid feed manifold 32 via line 218. The coil 14 functions as an intermediate pressure condenser, the storage media being at approximately, for instance, 60° F. for system efficiency. The coil 14 is connected to the compressor so as to return vapor at intermediate pressure, in this case to cylinder 1 through line 136. Solenoid operated control valve $V_3$ is de-energized and closed so that coil 14 does not see suction manifold 28 and is not pulled down to that pressure. As such, cylinder 2 receives intermediate pressure vapor from subcooler coil 34, cylinder 1 receives a different intermediate pressure vapor from coil 14, while cylinders 3 and 4 are operating at a further pressure level as defined by the suction pressure within manifold 28. The solenoid operated control valve $V_{15}$ (de-energized and closed) check valves $C_{17}$ and $C_{18}$ prevent flow of subcooler return vapor to cylinder 1, this vapor returning only to cylinder 2. The presence of check valve $C_{17}$ permits, however, vapor from the direct solar/storage coil 14 to pass additionally to cylinder 2 as well as cylinder 1, thus effecting reduced subcooling action and reduced mass return of vapor through line 146 from the subcooler. Cylinder 1 discharges from its outlet 76 through bypass line 90 to line 88 leading to the discharge manifold, with solenoid operated control valve $V_{16}$ de-energized and closed. Additionally, the high side 62 of cylinder 2 is connected to line 88 at outlet 78 so that the discharge manifold 26 receives parallel flow from cylinders 1 and 2. Check valve $C_{15}$ prevents flow back through cylinder 1 from line 88.

Since the inside air coil 16 is at a condensing temperature of for instance 80° F. while the water temperature within tank 186 may produce condensing temperature of 120° F. within that coil, the coil 16 is functioning as a low pressure condenser, and for system efficiency, it receives compressed refrigerant vapor from compressor 11 from the high side 68 of cylinder head 15. Refrigerant vapor passes through line 156 which connects with the outlet line 86 for cylinders 3 and 4, the line 156 including solenoid operated control valve $V_{10}$ which is energized and open and check valve $C_5$. Since the condensed refrigerant within seal pot 40 is at a pressure lower than that of the condenser of coil 18, it is necessary that the pump 44 be energized to positively pump liquid refrigerant from seal pot 40 to the receiver 24 which is at the pressure determined by the highest condenser pressure in the system, in this case defined by the hot water coil 18. Thus, in the instant case, the compressor 11 sees a number of pressure levels as defined by the subcooler return vapor within line 146, the direct solar storage coil return vapor within line 136, the pressure of the discharge manifold 26 as defined by the high pressure condensing coil 18 and the pressure within line 156 as defined by the inside air coil or low pressure condenser 16. Check valves $C_{13}$ and $C_{16}$ prevent the high pressure discharge flow from cylinders 1 and 2 from affecting the lower pressure discharge for cylinder 3 and as defined by inside air coil condensing conditions. Likewise, check valves $C_{17}$ and $C_{18}$ insure separate flow of the subcooler return and the direct solar storage return vapor to cylinders 2 and 1, absent merger of the vapor flow of line 136 with that of the subcooler return within line 146 under conditions wherein the pressure within that line equals or exceeds that of the subcooler return.

Turning next to FIG. 1c, this figure illustrates the modular heat pump system under heating mode at low ambient condition, in which there is no heat available for heating the water W of the hot water tank 186, and wherein heat is extracted both from the outside air and the storage media M within the direct solar storage tank 180. The situation in this case is very similar to that of FIG. 1b, subcooling is supplied, and in addition the compressor is staged with the outlet or discharge of cylinders 3 and 4 feeding to the inlet at the low side of cylinder 2 along with the subcooler return vapor through line 146. The total output of the compressor 11 is fed to the discharge manifold 26 where it is made available to the inside air coil 16 for heating of the space 184 under the low outside ambient conditions, the outside air being at, for instance, 20° F. Solenoid operated control valves $V_1$, $V_5$, $V_9$, $V_{11}$, $V_{12}$, $V_{13}$, $V_{17}$ and $V_{18}$ are energized and open, while solenoid operated control valves $V_2$ through $V_4$ inclusive, $V_6$ through $V_8$ inclusive, $V_{10}$, $V_{14}$ through $V_{16}$ inclusive, $V_{19}$ and $V_{20}$ are de-energized and closed. The pumps 43, 44 and 44 are all de-energized.

Condensed refrigerant R from the seal pot 40 is directed to the receiver 24 through the bypass line 226a and check valve $C_{10}$, this liquid refrigerant R is subcooled by way of the accumulator coil 36 and subcooler coil 34 and is fed to the outside air coil and the direct solar storage coil 14 by way of liquid feed manifold 32. With solenoid operated control valves $V_1$ and $V_{11}$ open and coil 12 operating at 20° F. saturation, the vaporized refrigerant returns to the suction manifold 28 through line 200 and solenoid operated control valve $V_1$. The vapor within the suction manifold 28 passes to cylinders 3 and 4 and low side 66 of the right cylinder head 15 through inlet 74 by energization of solenoid operated control valve $V_{17}$. The subcooler return vapor through line 146 is directed to cylinder 2, via line 130. The direct solar storage coil 14 is providing heat from the storage tank which again for illustrative purposes may be at 60° F., the vaporized refrigerant being directed to that coil through line 218 upon energization of solenoid operated control valve $V_{12}$. The vapor, being at an intermediate pressure and above that of the vapor returning from the outside air coil 12, is segregated from that return by maintaining de-energization of solenoid operated control valve $V_3$ and effecting energization of solenoid operated control valve $V_9$, the vapor passing through line 136 to cylinder 1 by connection to line 134 at point 138. Check valve $C_{12}$ prevents that return from passing to cylinders 3 and 4 through line 130. The compressor is in staged operation to maximize the efficiency of the compressor and system efficiency, and in that regard, solenoid operated control valve $V_{18}$ is energized and open, permitting flow through line 172 from the common outlet manifold 82 for the vapor compressed by cylinders 3 and 4 at high side 68 of the left cylinder head 15, line 172 being connected to line 130 at a common connection point 148 with the subcooler return line 146. Thus, the subcooler return merges with the discharge from right cylinder head 15 and the higher pressure dictates the ratio of vapor from the subcooler or the first stage cylinders 3 and 4 available to cylinder 2 for second stage compression. Further, it is this cylinder 2 low side pressure which acts to pressurize the crank case for both cylinder heads 13 and 15 by way of port 252 and conduit 254 which opens to the opposite cylinder head as at 15. Conduit 254 is shown as being elongated. However, it may in fact be non-existent if there is a common crank case for all cylinders of compressor 11. However, schematically, by way of its termination 256, it is evident that the crank case pressures for all cylinders are at an intermediate pressure level and in this case at first stage discharge pressure. Solenoid operated control valve $V_{16}$ is de-energized and closed, and as such, the discharge from cylinders 1 and 2 flow in parallel to the discharge manifold 26, with check valve $C_{15}$ within line 90 functioning to prevent the high pressure second stage discharge within line 88 from flowing back to the high side 58 of cylinder 1. Check valve $C_{13}$ prevents the higher pressure within line 88 from reaching the common outlet manifold 82. As may be appreciated, energization of solenoid operated control valve $V_{16}$ permits the discharge or high side 58 of cylinder 1 to open to the common outlet manifold 82 and thus the compressor is capable of compression in first stage operation through cylinders 1, 3 and 4 and second stage through cylinder 2 alone, dependent upon system operating parameters to maximize if possible both compressor efficiency and system efficiency.

Turning to FIG. 1d, the system is shown in operation under a heating mode under very cold ambient conditions on the order of 20° F. for the outside air coil 12, the assumption is made that the system has been operating after several cloudy days and that the temperature of the media M within the tank 180 has been sufficiently reduced so that there is in effect no heat available from that media and there is insufficient solar radiation S to provide such heat. The system is operating again without capacity to heat the water W within the hot water tank, which must be heated by other means such as an electrical resistance heater, and all of the heat available from the outside air is employed in heating the building interior or space 184 by employing the inside air coil 16 in its condensing function. In that respect all of the refrigerant compressed by the compressor 11 is supplied to the discharge manifold 26 through line 88, and that refrigerant is directed to the inside air coil 16. Solenoid operated control valves $V_1$, $V_5$, $V_{11}$, $V_{13}$ $V_{16}$, $V_{17}$, and $V_{18}$ are energized and open, while valves $V_2$ through $V_4$ inclusive, $V_6$ through $V_{10}$ inclusive, $V_{12}$, $V_{14}$, $V_{15}$, and $V_{19}$ and $V_{20}$ are de-energized and closed. Pumps 42, 43 and 44 are off. With solenoid operated control valve $V_5$ open, the compressed refrigerant vapor is directed to the inside air coil 16 where it condenses to heat the building interior, the condensed refrigerant accumulating within the seal pot 40 and passing to the receiver 24 through the bypass line 226a and check valves $C_{10}$ and $C_9$, in that order. With solenoid operated control valve $V_{13}$ open, subcooling is achieved with the subcooler return through line 146, at intermediate pressure, being directed to cylinder 2 at inlet 74, line 146 merging with line 130 at point 148. The subcooled liquid refrigerant is directed to the outside air coil 12 functioning as the system evaporator and picking up heat from the ambient upon energization of solenoid operated control valve $V_{11}$. Energization of solenoid operated control valve $V_1$ provides return of the vaporized refrigerant vapor through line 200 to the suction manifold 28, where it passes via lines 128 and 128' and through the accumulator 22, to inlet 74 of the low side 66 common to compressor cylinders 3 and 4 of cylinder head 15.

Additionally, vapor at suction manifold pressure is directed through lines 130 and 134 to inlet 70 to low side 56 of cylinder 1. The solenoid operated control valve $V_{16}$ being energized permits the discharge from cylinder 1 at high side 58 to pass from outlet 76 to the common outlet manifold 82, this outlet manifold 82 also receiving the discharge from high side 68 for cylinders 3 and 4 which passes via line 86, bearing check valve $C_{16}$, through the common outlet manifold 82. The discharge therefore from cylinders 1, 3 and 4 is available to the inlet 72 at the low side 60 of cylinder 2 for staged compression of that vapor prior to discharge and passage to the discharge manifold 26. The energization of solenoid operated control valve $V_{18}$ permits flow from the common outlet manifold 82 of the partially compressed vapor from cylinders 1, 3 and 4 to point 148 where the line 172 connects to lines 146 and 130. Thus, cylinder 2 receives the discharge of the cylinders 1, 3 and 4 as well as return vapor from the subcooler 34. This vapor is compressed by the piston within cylinder 2, discharged to the high side 62 of cylinder 2, and exits through outlet 78 and line 88 to the discharge manifold 26. Since the pressure of the vapor within line 88 is in excess of that discharging through line 84, from cylinder 1, check valve $C_{15}$ prevents that flow from flowing to the high side 58 of cylinder 1, and obviously due to the pressure within line 88, the discharge from cylinder 1 must pass through solenoid operated control valve $V_{16}$ to the common outlet manifold 82 and thence to cylinder 2 for second stage compression. The high pressure vapor within line 130 as provided by the subcooler and the compressor cylinders 3, 4 cannot flow to the inlet 70 of cylinder 1 because of the presence of check valve $C_{17}$ within line 140 and check valve $C_{18}$ within line 130 upstream of connection point 148.

Referring to FIG. 1d, there is shown in dotted line the effect of connecting the first stage discharge from cylinders 3 and 4 as well as the subcooler return to cylinders 1 and 2 for second stage compression by utilization of both cylinders 1 and 2 for this purpose. In that respect, this is achieved automatically by sensing system parameters indicating that the cylinder 2 is incapable of handling the mass flow requirements provided by way of the discharge of vapor from cylinders 3 and 4 after first stage compression as well as subcooler return in line 146. In that case, upon energization of solenoid operated control valve $V_{15}$, a portion of the vapor, instead of flowing to inlet 72 for cylinder 2, flows through line 150 and through the solenoid operated control valve $V_{15}$ and check valve $C_{14}$ to line 134 and inlet 70. In this case, it is necessary to de-energize solenoid operated control valve $V_{16}$ cutting off the high side 58 of cylinder 1 to the common outlet manifold 82 and forcing the now staged refrigerant flow second stage compressor discharge for cylinder 1 to flow through line 90, in parallel with the flow from cylinder 2 through line 88, to discharge manifold 26.

FIG. 1e illustrates the heat pump system embodiment of the present invention in operation under a cooling mode in which the compressor is in single stage operation and employing all four cylinders, with subcooling, and wherein the system is functioning to cool the building interior or space 184 by operation of the inside air coil 16 as an evaporator. Further, the heat generated in cooling of the building interior 184 is insufficient to heat the water W of the hot water tank 186, and a portion of that heat needed to heat water W necessarily is extracted from the storage tank 180.

In this case, solenoid operated control valves $V_6$, $V_7$, and $V_9$, $V_{12}$ through $V_{14}$ inclusive and $V_{17}$ are energized and open, while solenoid operated control valves $V_1$ through $V_5$ inclusive, $V_8$, $V_{10}$, $V_{11}$, $V_{15}$, $V_{16}$, $V_{18}$, $V_{19}$ & $V_{20}$ are de-energized and closed. Pumps 42, 43 and 44 are off. The compressor is operating under a mode in which the discharge from cylinders 1 and 2 via line 88 passes to the discharge manifold 26 which feeds refrigerant in vapor form to the hot water coil 18 for heating the water W within tank 186 along with compressed vapor from cylinders 3 and 4. The water W is assumed to be at 120° F. in which case the coil 18 becomes the system high pressure condenser. The liquid refrigerant is returned from coil 18 to receiver 24 where it is directed to the accumulator coil 36 and subcooler coil 34 for subcooling. A portion of the refrigerant is bled from the line 164 leading from the subcooler coil 34 to the liquid feed manifold 32 for subcooling purposes upon energization of solenoid operated control valve $V_{13}$. The vapor generated in subcooling is returned to the compressor via line 146 and directed to the inlet 72 for cylinder 2, through line 130, which connects to line 146 at point 148. The subcooled liquid refrigerant within liquid feed manifold 32 is directed to the inside air coil 16 functioning as an evaporator coil and thus removing heat from the building interior or space 184 through line 234 upon energization of solenoid operated control valve $V_{14}$. The inside air coil functions as the system low pressure evaporator returning vapor through line 238 upon energization of solenoid operated control valve $V_6$ leading to the suction manifold 28. This vapor after passing through accumulator 22 via lines 128 and 128' is directed by line 128' to inlet 74 to the low side 66 of cylinders 3 and 4 of the compressor by energization of solenoid operated control valve $V_{17}$. The refrigerant vapor compressed by cylinders 3 and 4 passes to discharge manifold 26, via line 94 and 88.

Some heat is being removed from the media M within the direct solar storage tank 180, this being achieved by energization of solenoid operated control valve $V_{12}$ which permits subcooled liquid refrigerant to flow to the coil 14 where it picks up heat by the latent heat of vaporization with vapor returning to the compressor through line 136 due to energization of solenoid operated control valve $V_9$. The maintenance of solenoid operated control valve $V_3$ closed prevents the discharge side of coil 14 to be connected to the suction manifold 28. Line 136 leads to inlet 70 at the low side 56 of cylinder 1, cylinder 1 discharging compressed vapor which exits through line 90 and check valve $C_{15}$ to the discharge manifold 26 along with flow from the high side 62 of cylinder 2 which passes directly into line 88. Solenoid operated control valve $V_{16}$ is closed to insure this parallel flow from the discharge of cylinders 1 and 2 to the discharge manifold 26.

The system, therefore, shows the compressor 11 operating such that there are different pressure levels both on the suction and discharge sides of the various compressor cylinders. The low side 66 of cylinders 3 and 4 is at a suction pressure determined by the inside air coil 16. The high side 68 is at a discharge pressure as defined by the one condenser of the system in operation, that is, the hot water coil 18. The low side 60 of cylinder 2 is at an intermediate pressure defined by subcooler return vapor within line 146 and which under normal conditions is the pressure within the crank case underlying all four cylinders, while the low side 56 of cylinder 1 is at an intermediate pressure as defined by the operating conditions of the intermediate evaporator coil 14 within the direct solar/storage tank 180. The high sides 58 and 62, of cylinders 1 and 2, also seek the common discharge pressure as defined by hot water coil 18, for cylinders 3 and 4, to which it is directly connected through line 88 and discharge manifold 26. Check valves $C_{13}$ and $C_{16}$ function to communicate the cylinders of respective cylinder heads 13 and 15, while check valves $C_{17}$ and $C_{18}$ maintain separate conditions for the low sides 56 and 60 of cylinders 1 and 2, respectively.

Referring next to FIG. 1f, the system is shown purposely in a different cooling mode wherein the various pressure levels for the compressor 11 and the ability to accept and supply refrigerant vapor at those pressure levels may be readily appreciated, although to some degree the illustrated operation of the system may have limited practicability. In that regard, the system is operating such that the hot water coil 18 functions as the system high pressure condenser, the direct solar/storage coil 14 functions as the system intermediate or low pressure condenser, and the outside air coil 12 as well as the inside air coil 16 act as the evaporator coils at different saturation temperatures and one coil 16 returns to the suction manifold 28. In the illustrated mode, FIG. 1f, solenoid operated control valves $V_6$, $V_7$, $V_{11}$, $V_{13}$, $V_{14}$, $V_{17}$, $V_{19}$ and $V_{20}$ are energized and open, while solenoid operated control valves $V_1$ through $V_5$ inclusive, and $V_8$ through $V_{10}$ inclusive, $V_{12}$, $V_{15}$, $V_{16}$, and $V_{18}$ are de-energized and closed. Pumps 42 and 44 are off while pump 43 is on. Vapor at compressor discharge from line 88 and within discharge manifold 26 flows to the hot water coil 18 functioning as the high temperature, high pressure condenser to maintain the water W within the water tank 186 at a temperature on the order of 120° F. upon energization of solenoid operated control valve $V_7$. The high pressure condensed refrigerant R flows to the receiver 24, where that refrigerant is subcooled by passage through the accumulator coil 36 and subcooler coil 34 via line 126 and flows to the liquid feed manifold 32 at the discharge from the subcooler 20 via line 164. With solenoid operated control valve $V_{13}$ open, subcooling is achieved and the subcooler return vapor passes to the compressor for recompression via line 146 and being at an intermediate pressure, that is, somewhat above the pressure of the suction manifold 28 receiving the return from coils 12 and 16. The subcooled refrigerant within the liquid feed manifold 32 flows to the inside air coil 16 functioning as one of the system evaporators through line 234 with solenoid operated control valve $V_{14}$ being open and returns to the suction manifold through line 238 on the opposite side of coil 16 with solenoid operated control valve $V_6$ energized and open. Likewise, some of the refrigerant passes through the liquid feed manifold 32 to the outside air coil via line 198 with the solenoid operated control valve $V_{11}$ energized and open, the refrigerant vapor after picking up heat by the latent heat of vaporization within that coil 12 returning to cylinder 1 of the compressor through line 201 with solenoid operated control valve $V_1$ closed and solenoid operated control valve $V_{20}$ energized and open. After passage through lines 128 and 128′, and insured vaporization within accumulator 22, the suction return vapor passes to the low side 66 of cylinders 3 and 4 since solenoid operated control valve $V_{17}$ is open to the flow entering inlet 74 and is prevented from flowing to cylinder 1 by check valve $C_{12}$.

The discharge from cylinder 1 via outlet 76 is through line 90 to its point of intersection at 92 with line 88 and thence to the discharge manifold 28, cylinder 2 also discharging through line 88 to that manifold. The vapor return to cylinders 1 and 2 is therefore supplied to the high pressure condenser 18. In addition, discharge through line 160 from outlet 80 on the high side 68 of cylinders 3 and 4 permits the flow of refrigerant at a pressure level determined by direct solar/storage coil 14 whose pressure is dependent upon the condensing temperature of the media M within direct solar/storage coil tank 180, which may be 80° F. Coil 14 functions as the system intermediate pressure condenser, and as such, upon the energization and opening of solenoid operated control valve 19, the refrigerant flow to that coil effects condensation and rejection of heat to the media M, raising its temperature, the condensed refrigerant accumulating as at R within seal pot 39 and the refrigerant being forced by the pulse energization of positive displacement pump 43 to flow through check valve $C_{18}$ and to the receiver 24 when liquid refrigerant reaches the level of the seal pot float. The seal pots 38, 39 and 40 are identical to those shown in application Ser. No. 924,015, identified previously. The seal pots include floats, as shown, for causing flow of accumulated refrigerant R to the receiver, upon rising to a predetermined level within the seal pots by effecting pulse energization of pump 43. Since the pressure of the refrigerant within line 208 is less than that of the receiver 24, pump 43 must be energized to positively drive the refrigerant to the receiver and overcome the higher pressure of the receiver as determined by the high pressure condenser 18. Check valves $C_{13}$ and $C_{15}$ isolate the high side pressures for cylinders 1 and 2 from the high side of cylinders 3 and 4, check valves $C_{17}$ and $C_{18}$ isolate the low side pressure for cylinders 1 and 2.

Further, in like manner to application Ser. No. 924,015, various changes may be made to the system in terms of substituting for the subcooler operation and for the seal pots and positive displacement pumps in the manner of FIG. 3 of that application which has common features to the illustrated embodiment of this invention, or in other appropriate manner.

It should also be evident that the capability of the compressor may be additionally varied by utilizing a two speed motor for driving of the compressor pistons such that a large number of available pressure levels are available using multi-speed, four cylinders and the staging capability.

While the invention has been particularly shown and described with reference to a preferred embodiment thereof, it will be understood by those skilled in the art that various changes in form and details may be made therein without departing from the spirit and scope of the invention.

What is claimed is:

1. A refrigeration system for conditioning a confined space, said system comprising:
   a first, inside heat exchanger coil within said space,
   a second, outside heat exchange coil exterior of said space,
   a third heat exchange coil exterior of said space and functioning to supply heat to the system or to store heat derived therefrom,
   a fourth heat exchange coil functioning as a system high temperature condenser for supplying a high temperature heating load,
   a compressor,
   conduit means carrying refrigerant and connecting said coils and said compressor in a closed refrigeration loop circuit and including means for selectively causing said coils to function as evaporators or condensers, with said coils functioning dependent upon temperature parameters as high pressure condenser, intermediate pressure condenser, low pressure evaporator and intermediate pressure evaporator,
   a subcooler within said circuit,
   said subcooler including a subcooling heat exchange coil for subcooling condensed refrigerant from any of said first, second, third and fourth coils functioning as a condenser,
   the improvement comprising:
      said compressor comprising a first and a second cylinder head, and first, second, third and fourth cylinders,
      said first cylinder head including said first and said second cylinders,
      said second cylinder head including said third and said fourth cylinders,
      said first cylinder head including first manifold means separating said first and said second cylinders and defining low pressure and high pressure sides for said respective cylinders,
      said second cylinder head comprising second manifold means defining commonly, low and high pressure sides for both said third and said fourth cylinders,
      said first cylinder head including a first inlet to the low pressure side of said first cylinder and a second inlet to the low pressure side of said second cylinder,
      said second cylinder head comprising a third inlet, said third inlet being common to the low pressure side of said third and said fourth cylinders,
      said first cylinder head comprising a first outlet for said first cylinder and a second outlet for said second cylinder,
      said second cylinder head comprising a third outlet, said third outlet being common to said third and said fourth cylinders, said conduit means further including:
- a common outlet manifold,
- means connecting said first outlet to said common outlet manifold and means connecting said third outlet to said common outlet manifold,
- means including a first flow control valve for selectively connecting said common outlet manifold to said second inlet,
- means for connecting said second outlet to one of said coils functioning as the system high pressure condenser,
- means for connecting said common outlet manifold to said coil functioning as said system high pressure condenser in parallel with said second outlet connecting means and including first check valve means for preventing flow from said second outlet back to said common outlet manifold, and
- second check valve means between said common outlet manifold and said third outlet, such that said coil functioning as the system high pressure condenser may receive first stage compressor discharge from all four cylinders through said first, second and third outlets; from said first and second outlets alone with said third and fourth cylinders supplying refrigerant to one of said coils functioning as the system intermediate pressure condenser; from said first and second outlets alone with said third outlet connected to said second inlet upon opening of said flow control valve with said first and second cylinders discharging in second stage, and from said second outlet alone with said first, third and fourth cylinders functioning in first stage compression and feeding to the second inlet through said flow control valve.

2. The refrigeration system as claimed in claim 1, wherein said subcooler includes a subcooler vapor return line connected to said second inlet, and wherein said conduit means further includes means for connecting the outlet of said coil functioning as the system intermediate pressure evaporator to said first inlet, means for connecting the outlet of said coil functioning as the system low pressure evaporator to said third inlet, such that said first cylinder compresses vapor returning at an intermediate pressure determined by the saturation temperature of the coil functioning as the system intermediate pressure evaporator, said second cylinder functions to compress intermediate pressure vapor returned from the subcooler, and said third and fourth cylinders function to compress low pressure suction return vapor from the coil functioning as the system low pressure evaporator, and said system includes means connecting said first and second inlets and including third check valve means such that when said first cylinder is incapable of compressing the mass flow requirements as determined by said intermediate pressure evaporator, some of the mass flow from that coil passes to said second inlet for compression by said second cylinder along with vapor return from the subcooler.

3. The refrigeration system as claimed in claim 1, wherein said conduit means further comprise a second control valve, said second control valve being within said means connecting said first outlet to said common outlet manifold and a first bypass line connected between said first outlet and said second control valve and said coil functioning as the system high pressure condenser and including fourth check valve means therein for permitting parallel flow from said first and said second outlets for said first and said second cylinders to said coil functioning as the system high pressure condenser when said second control valve is closed, and permitting flow from said first outlet to said common outlet manifold when said second control valve is open to permit second stage compression of said first, said third and said fourth cylinders by said second cylinder.

4. The refrigeration system as claimed in claim 2, wherein said conduit means further comprise a second control valve, said second control valve being within said means connecting said first outlet to said common outlet manifold and a first bypass line connected between said first outlet and said second control valve and said coil functioning as the system high pressure condenser and including fourth check valve means therein for permitting parallel flow from said first and said second outlets for said first and said second cylinders to said coil functioning as the system high pressure condenser when said second control valve is closed, and permitting flow from said first outlet to said common outlet manifold when said second control valve is open to permit second stage compression of said first, said third and said fourth cylinders by said second cylinder.

5. The refrigeration system as claimed in claim 3, wherein said conduit means further comprises a second bypass line connecting said outlet manifold to said first inlet, a third control valve within said second bypass line such that when said third control valve is open, flow is permitted between said third outlet and said first and second inlets to cause in addition to said second cylinder, said first cylinder to compress refrigerant vapor under second stage compression for flow to the coil functioning as the system high pressure condenser.

6. The refrigeration system as claimed in claim 4, wherein said conduit means further comprises a second bypass line connecting said outlet manifold to said first inlet, a third control valve within said second bypass line such that when said third control valve is open, flow is permitted between said third outlet and said first and second inlets to cause in addition to said second cylinder, said first cylinder to compress refrigerant vapor under second stage compression for flow to the coil functioning as the system high pressure condenser.

7. The refrigeration system as claimed in claim 3, wherein said conduit means further comprises an intermediate pressure feed line connecting said third outlet to the inlet side of a coil functioning as the system intermediate pressure condenser, a fourth control valve within said intermediate pressure feed line such that upon opening of said fourth control valve, refrigerant vapor compressed by said third and said fourth cylinders is fed from said third outlet to said intermediate pressure condenser, while compressed refrigerant vapor is also fed from said first and second outlets to said coil functioning as the system high pressure condenser, and wherein said system further comprises means for effecting condensed refrigerant flow from both condensers to the coil or coils within said system functioning as system evaporators.

8. The refrigeration system as claimed in claim 4, wherein said conduit means further comprises an intermediate pressure feed line connecting said third outlet to the inlet side of a coil functioning as the system intermediate pressure condenser, a fourth control valve within said intermediate pressure feed line such that upon opening of said fourth control valve, refrigerant vapor compressed by said third and said fourth cylinders is fed from said third outlet to said intermediate pressure condenser, while compressed refrigerant vapor is also fed from said first and second outlets to said coil functioning as the system high pressure condenser, and wherein said system further comprises means for effecting condensed refrigerant flow from both condensers to the coil or coils within said system functioning as system evaporators.

9. The refrigeration system as claimed in claim 5, wherein said conduit means further comprises an intermediate pressure feed line connecting said third outlet to the inlet side of a coil functioning as the system intermediate pressure condenser, a fourth control valve within said intermediate pressure feed line such that upon opening of said fourth control valve, refrigerant vapor compressed by said third and said fourth cylinders is fed from said third outlet to said intermediate pressure condenser, while compressed refrigerant vapor is also fed from said first and second outlets to said coil functioning as the system high pressure condenser, and wherein said system further comprises means for effecting condensed refrigerant flow from both condensers to the coil or coils within said system functioning as system evaporators.

10. The refrigeration system as claimed in claim 6, wherein said conduit means further comprises an intermediate pressure feed line outlet to the inlet side of a coil functioning as the system intermediate pressure condenser, a fourth control valve within said intermediate pressure feed line such that upon opening of said fourth control valve, refrigerant vapor compressed by said third and said fourth cylinders is fed from said third outlet to said intermediate pressure condenser, while compressed refrigerant vapor is also fed from said first and second outlets to said coil functioning as the system high pressure condenser, and wherein said system further comprises means for effecting condensed refrigerant flow from both condensers to the coil or coils within said system functioning as system evaporators.

11. The refrigeration system as claimed in claim 1, wherein said conduit means further comprises a suction pressure vapor return line connecting the outlet of the coil or coils within the system functioning as the system low temperature evaporators to said first, said second and said third inlets, and wherein said suction pressure vapor return line includes an unload control valve for selectively shutting off refrigerant vapor return from the outlet side of the coil functioning as the system low temperature evaporator to said third inlet, such that suction vapor return to the compressor is limited to said first and said second cylinders to permit the compressor to operate under fully unloaded conditions with said third and said fourth cylinders cut off from refrigerant flow.

12. The refrigeration system as claimed in claim 1, wherein a first line leads from the coil within said system functioning as the system low pressure evaporator to said third inlet, a first branch line leads from said first line to said second inlet, a second branch line leads from said first line to said first inlet, a fourth line leads from the subcooler to said second inlet for returning intermediate pressure refrigerant vapor to said second cylinder, a fifth line connects a coil within said system functioning as the system intermediate pressure evaporator to said first inlet for permitting return of intermediate pressure refrigerant vapor to said first cylinder for compression therein, second check valve means is provided within said first branch line for preventing intermediate pressure vapor flow from said intermediate pressure evaporator coil to said third inlet, third check valve means is provided within said first branch line for preventing subcooler return vapor to flow to said third inlet, a third branch line leads from said fifth line to said first branch line upstream of said second inlet and having a fourth check valve therein for permitting flow of intermediate pressure refrigerant vapor from said intermediate pressure evaporator coil to said second inlet but preventing subcooler return vapor from passing to said first inlet by way of said third branch line; whereby, said third and said fourth cylinders; may provide refrigerant at common discharge pressure in parallel with said first and said second cylinders to said coil functioning as the system high pressure evaporator; may supply independently and separately from said first and said second cylinders refrigerant vapor at discharge pressure to the coil or coils within said system functioning as the system intermediate pressure condensers; may receive refrigerant vapor return from said coil within said system functioning as the system low pressure evaporator; and may provide first stage compression of refrigerant vapor exclusively, or in conjunction with said first cylinder and wherein said first cylinder; may receive refrigerant vapor return from the coil functioning within the system as the system low temperature evaporator; may receive intermediate pressure vapor return from the coil or coils functioning as the system intermediate pressure evaporators; or may receive intermediate pressure vapor return from the subcooler, and said second cylinder; may function to compress a portion of the low pressure vapor return from the coil functioning as the system low pressure evaporator; may receive exclusively or in parallel with said first cylinder, intermediate pressure vapor return from the subcooler or both the intermediate pressure subcooler vapor return from the subcooler and intermediate pressure vapor return from the system coil or coils functioning as the system intermediate pressure evaporators and exclusively or in parallel with said first cylinder, the discharge from said third cylinder and said fourth cylinder under staging operation, or in parallel with said first cylinder discharge during compressor staging; and may selectively, or in combination, supply compressed refrigerant vapor at discharge pressure to the coil within the system functioning as system high pressure condenser.

13. A refrigeration system for conditioning a confined space, said system comprising:
 a first, inside heat exchange coil within said space,
 a second, outside heat exchange coil exterior of said space,
 at least one other heat exchange coil,
 a compressor,
 conduit means carrying refrigerant and connecting said coils and said compressor in a closed refrigeration loop circuit and including means for selectively causing said coils to function as evaporators or condensers, with said coils functioning dependent upon temperature parameters as high pressure condenser, intermediate pressure condenser, or evaporator,
 subcooler means within said circuit, for removing heat from condensed refrigerant from any of said first and second coils functioning as a condenser,
 the improvement comprising:

said compressor comprising a first and a second cylinder head, and first, second, third and fourth cylinders, said first cylinder head including said first and said second cylinders, said second cylinder head including said third and said fourth cylinders, said first cylinder head including first manifold means separating said first and said second cylinders and defining low pressure and high pressure sides for said respective cylinders, said second cylinder head comprising second manifold means defining commonly, low and high pressure sides for both said third and said fourth cylinders, said first cylinder head including a first inlet to the low pressure side of said first cylinder and a second inlet to the low pressure side of said second cylinder, said second cylinder head comprising a third inlet, said third inlet being common to the low pressure side of said third and said fourth cylinders, said first cylinder head comprising a first outlet for said first cylinder and a second outlet for said second cylinder, said second cylinder head comprising a third outlet, said third outlet being common to said third and said fourth cylinders, said conduit means further including:
a common outlet manifold,
means connecting said first outlet to said common outlet manifold and means connecting said third outlet to said common outlet manifold,
means including a first flow control valve for selectively connecting said common outlet manifold to said second inlet
means for connecting said second outlet to one of said coils functioning as the system high pressure condenser,
means for connecting said common outlet manifold to said coil functioning as said system high pressure condenser in parallel with said second outlet connecting means and including first check valve means for preventing flow from said second outlet back to said common outlet manifold, and
second check valve means between said common outlet manifold and said third outlet, such that said coil functioning as the system high pressure condenser may receive first stage compressor discharge from all four cylinders through said first, second and third outlets, from said first and second outlets alone with said third and fourth cylinders supplying refrigerant to one of said coils functioning as the system intermediate pressure condenser; from said first and second outlets alone with said third outlet connected to said second inlet upon opening of said flow control valve with said first and second cylinders discharging in second stage, and from said second outlet alone with said first, third and fourth cylinders functioning in first stage compression and feeding to the second inlet through said flow control valve.

14. The refrigeration system as claimed in claim 13, wherein one of said coils functions as an intermediate pressure evaporator wherein a subcooler vapor return line is connected to said second inlet, and wherein said conduit means further includes means for connecting the outlet of said coil functioning as the system intermediate pressure evaporator to said first inlet, means for connecting the outlet of said coil functioning as the system low pressure evaporator to said third inlet, such that said first cylinder compresses vapor returning at an intermediate pressure determined by the saturation temperature of the coil functioning as the system intermediate pressure evaporator, said second cylinder functions to compress intermediate pressure vapor return from the subcooler vapor return line, and said third and fourth cylinders function to compress low pressure suction return vapor from the coil functioning as the system low pressure evaporator, and said system includes means connecting said first and second inlets and including third check valve means such that when said first cylinder is incapable of compressing the mass flow requirements as determined by said intermediate pressure evaporator, some of the mass flow from that coil passes to said second inlet for compression by said second cylinder along with vapor return from the subcooler means.

15. The refrigeration system as claimed in claim 13, wherein said conduit means further comprises a second control valve, said second control valve being within said means connecting said first outlet to said common outlet manifold and a first bypass line connected between said first outlet and said second control valve and said coil functioning as the system high pressure condenser and including fourth check valve means therein for permitting parallel flow from said first and said second outlets for said first and said second cylinders to said coil functioning as the system high pressure condenser when said second control valve is closed, and permitting flow from said first outlet to said common outlet manifold when said second control valve is open to permit second stage compression of said first, said third and said fourth cylinders by said second cylinder.

16. The refrigeration system as claimed in claim 15, wherein said conduit means further comprises a second bypass line connecting said outlet manifold to said first inlet, a third control valve within said second bypass line such that when said third control valve is open, flow is permitted between said third outlet and said first and second inlets to cause in addition to said second cylinder, said first cylinder to compress refrigerant vapor under second stage compression for flow to the coil functioning as the system high pressure condenser.

17. The refrigeration system as claimed in claim 15, further comprising an intermediate pressure feed line connecting said third outlet to the inlet side of a coil functioning as the system intermediate pressure condenser, a fourth control valve within said intermediate pressure feed line such that upon opening of said fourth control valve, refrigerant vapor compressed by said third and said fourth cylinders is fed from said third outlet to said intermediate pressure condenser, while compressed refrigerant vapor is also fed from said first and second outlets to said coil functioning as the system high pressure condenser, and wherein said system further comprises means for effecting condensed refrigerant flow from both condensers to the coil or coils within said system functioning as system evaporators.

18. The refrigeration system as claimed in claim 13, wherein said conduit means further comprises a suction pressure vapor return line connecting the outlet of the coil or coils within the system functioning as the system low temperature evaporators to said first, said second and said third inlets, and wherein said suction pressure vapor return line includes an unload control valve for selectively shutting off refrigerant vapor return from the outlet side of the coil functioning as the system low temperature evaporator to said third inlet, such that suction vapor return to the compressor is limited to said first and said second cylinders to permit the compressor to operate under fully unloaded conditions with said third and said fourth cylinders cut off from refrigerant flow.

* * * * *

UNITED STATES PATENT AND TRADEMARK OFFICE
CERTIFICATE OF CORRECTION

PATENT NO. : 4,209,996
DATED : July 1, 1980
INVENTOR(S) : David N. Shaw

It is certified that error appears in the above—identified patent and that said Letters Patent is hereby corrected as shown below:

The attached Columns 9-12 should be inserted as part of the above-identified patent.

THIS CERTIFICATE OF CORRECTION APPLYS EXCLUSIVELY TO THE GRANT

Signed and Sealed this

Twenty-eighth Day of October 1980

[SEAL]

Attest:

SIDNEY A. DIAMOND

Attesting Officer

Commissioner of Patents and Trademarks connects to line 130 at point 148; line 146 opening to the interior of the subcooler at point 114.

As stated previously, the four cylinder compressor is capable of staged operation by either utilizing cylinder 2 alone or cylinders 1 and 2 in parallel as the second stage of compression. This is effected by way of a line 172 which leads from the common outlet manifold 82 to connection point 148 with line 130 upstream of the inlet 72 and opening to the low side 60 of cylinder 2. A solenoid operated control valve $V_{18}$ is positioned within line 172 such that when this valve is energized, the discharge of cylinders 3 and 4 exits from the common outlet manifold 82, and passes to the suction or low side 60 of cylinder 2 for the left cylinder head 13. The second stage vapor discharges at high pressure from cylinder head 13 at high side 62 of cylinder 2 through line 88 which connects directly to the discharge manifold 26. Under single cylinder automatic staged operation, solenoid operated control valve $V_{16}$ is energized to connect the high side or outlet 76 of cylinder 1 to the common outlet manifold 82, such that the common outlet manifold 82 receives the discharge from cylinders 1, 3 and 4 after initial compression and passes the partially compressed vapor to cylinder 2 for additional second stage compression. By energization of solenoid operated control valve $V_{18}$, this first stage compressor discharge is compressed by cylinder 2 to a higher pressure, whereas the high side 62 feeds to the discharge manifold 26 through line 88.

If cylinder 2 is incapable of providing the desired flow requirements at this pressure level, solenoid operated control valve $V_{15}$ is energized and line 150 opens to permit high pressure flow through check valve $C_{14}$ to line 134 leading to inlet 70 for cylinder 1, in this case the discharge from cylinder 1 passes by way of line 90 and check valve $C_{15}$ to the line 88, it being necessary to simultaneously de-energize solenoid operated control valve $V_{16}$ to take cylinder 1 off the line with respect to the common outlet manifold 82.

Solenoid operated control valve $V_{17}$ within line 128' is provided principally to permit unloading of the compressor by simply shutting off the flow of suction gas to the common low side 66 for cylinders 3 and 4 of cylinder head 15.

As indicated previously, the subject invention is particularly applicable to modular refrigeration systems in which various coils may be coupled to suction and discharge manifolds and liquid drain and liquid feed manifolds with check valves and control valves, preferably automatically solenoid operated, to selectively operate given coils as condensers or evaporators, depending upon system needs and the availability of energy for the system or the necessity for its rejection as waste heat which is, of course, dependent largely on seaonal load variation in the case of heat pumps. In that respect, the refrigerant R, as indicated in liquid form within the bottom of receiver 24, may be Freon such as R12 and circulated through the system. Under the realization that the highest pressure refrigerant in vapor form discharges from the compression module 10 through line 88 to the discharge manifold 26, manifold 26 is connected to one side of outside air coil 12, direct solar coil 14, inside air coil 16, and hot water coil 18, with the same side of coils 12, 14, and 16 being additionally connected to the suction manifold 28. Coil 18 is purposely not connected to the suction manifold 28 so that coil 18 can function only as a condenser and not as an evaporator. The outside air coil 12 simply sets in the ambient, that is, in contact with the outside air, and air may flow over the coil 12 under forced air operation such as by way of a fan or blower (not shown). The direct solar storage coil 14 is immersed within a liquid media M carried by an insulated tank 180, one side of which is provided with a transparent window 181, permitting the rays of the sun indicated at S to impinge directly on the media and thus warm to same. A cover or shade (not shown) may be provided to window 18 for preventing selectively, such radiation. Obviously the media M may be heated by the sun indirectly by circulation with a heat exchange coil functioning as a solar collector under thermal siphonic, or forced liquid movement through tank 180. The coil 14, when functioning as a condenser, heats the media M, and the tank 180 therefore functions as a thermal energy storage tank by receiving waste heat from the loop as for instance when cooling the interior of building 8 by use of the inside air coil 16. The inside air coil 16 is shown within a casing 182 constituting a heat exchanger interiorly of the building and within space 184. Additionally, the building may carry a hot water tank as at 186 thermally insulated and bearing water W which is heated, coil 1 always functioning as a condenser and receiving refrig erant vapor discharged from the compressor 11. Water lines 188 permit removal of hot water as desired fo building needs, and the supply of fresh water to b heated.

The discharge manifold 26 is connected to the outsid air coil 12 by way of line 190 at 192, that line carryin the solenoid operated control valve $V_2$, and in additio the seal pot 38 acting to collect refrigerant R when th outside air coil 12 is functioning as a condenser, th refrigerant in liquid form being pumped by way of pos tive displacement pump 42 to receiver R through th liquid drain manifold 30, line 190 connecting to th liquid drain manifold 30 at point 194. A bypass line 19( bypasses pump 42 and includes check valves $C_7$, wh the line 190 also includes check valve $C_6$ between poi 194 and the connection of bypass line 190a. In order permit the outside air coil to function as an evaporat and to supply heat to the system, the liquid feed mar fold 32 connects at point 196 to line 198 which li includes solenoid operated control valve $V_{11}$ and whi connects to line 190 to one side of the outside air coil at 199. On the opposite side of that coil, there is pr vided a line 200 which connects at point 202 to line 1! on the opposite side of the outside air coil 12, and co nects to the suction manifold 28 at point 204 acting a return for refrigerant which is vaporized within t outside air coil 12 when that coil functions as a lo pressure evaporator, the vapor returning through so noid operated control valve $V_1$ and check valve ( permitting flow to the suction manifold but preventi flow in the opposite direction. Line 201 bearing so noid operated control valve $V_{20}$ and check valve ( connects to line 200 at 203 and line 136 at 205, perm ting selectively, intermediate pressure vapor return the compressor. All seal pots, such as seal pot 38 bea float controlling operation of underlying pumps, as 42 upon accumulation of liquid refrigerant to float lev The pumps cycle on and off.

The outside air coil may operate as an intermedi pressure condenser, in which case it receives vap from the compressor 11 through line 160 which open point 162 to the line 86 leading from the high side 68 the compressor right cylinder head 15 to the comm outlet manifold 82, the line 160 connecting to line aring the outside air coil at point 206. Line 160 includes solenoid operated control valve $V_8$ to permit ... w to the outside air coil when functioning as an inter-:diate pressure level condenser, but prevents reverse w by way of check valve $C_4$ in series therewith, that ... from the line 190 back to the high side 68 for com- :ssor cylinders 3 and 4.

Turning to the direct solar/storage coil 14, that coil is nnected to the discharge manifold 26 by way of line ᴥ which connects to the discharge manifold at point ᴥ, line 208 connects to the liquid drain manifold 30 at int 212 and bears solenoia operated control valve $V_4$ feeding high pressure compressor discharge refrig- ınt vapor to the coil 14 when that coil functions as a ;h pressure condenser to supply heat to the media M thin tank 180. Alternatively, the coil 14 may function an intermediate pressure condenser, receiving vapor ım line 160 via line 209 connected at 211 to line 1760 ᴥ at 213 to line 208. Line 209 carries in series, check ᴥve $C_{19}$ and solenoid operated control valve $V_{19}$. rther, coil 14 may function as an evaporator coil and nove heat from the media M as provided by the solar ′s S, in this case the coil 14 connects to the suction ᴥnifold 28 through line 214 which connects to line 208 ᴥoint 216 at one end and to the suction manifold 28 at ᴥnt 220 on the other end. Line 214 carries the solenoid ᴥrated control valve $V_3$ which, when energized, per- ᴥs vaporized refrigerant vapor to return to the com- ᴥssor via the accumulator, this vapor passing through ᴥck valve $C_2$.

Jnder circumstances where coil 14 is functioning as evaporator, it receives its liquid refrigerant from the ᴥid feed manifold 32 through line 218 which connects the liquid feed manifold 32 at point 221 and to line ᴥ at point 222 between the seal pot 39 and the coil 14. e line 208 includes the seal pot 39 and also a positive placement pump 43 and check valve $C_8$ so that when- ᴥr coil 14 functions as the low pressure condenser for system, its condensed refrigerant can be fed back to receiver 24 by positive pump operation. However, en the pump 43 is not needed, the bypass line 208a ᴥich bypasses the pump 43 and bears check valve $C_{20}$ ᴥmits the flow of refrigerant at condenser pressure m coil 14 to the receiver 24.

Further, the direct solar coil 14 may be functioning as system' intermediate pressure evaporator. In that ᴥe, refrigerant vapor at intermediate pressure is re- ᴥned to the compressor through line 136 which con- ᴥts to line 208 at point 224, enters the compression dule 10 at terminal 120 and connects to line 134 at ᴥnection point 138. The intermediate pressure refrig- ᴥnt vapor first flows to compressor cylinder 1 and ondly if needed, passes through check valve $C_{17}$ hin line 140 to port 144, thence through line 130 to inlet 72 of cylinder 2 so that both cylinders 1 and 2 y be compressing vapor at an intermediate pressure el defined by coil 14 rather than the pressure defined subcooler coil 34.

ᴥurning to the inside air coil 16, this coil functions narily to heat and cool the interior space 184 of lding 8 to be conditioned. In this respect, the dis- ᴥrge manifold 26 is connected to coil 16 via line 226 ᴥ28, the line 226 connecting, at the opposite side of ᴥ 16 to the liquid drain manifold 30 at point 230. ᴥhin line 226, in addition to coil 16, is the solenoid ᴥrated control valve $V_5$ which when energized and ᴥn, causes the high pressure refrigerant vapor to flow ᴥhe coil 16 which functions as a high pressure condenser, the condensed refrigerant entering seal pot 40 and flowing through positive displacement pump 44, if necessary, and check valve $C_9$ to the liquid drain manifold 30. Line 226 includes bypass line 226a bearing check valve $C_{10}$ and permitting flow about the positive displacement pump 44 without its energization, should the inside air coil 16 function as the high pressure condenser or at least at a condensing pressure equal to the other coils within the system functioning as condensers at that moment. The liquid feed manifold 32 is connected at point 232 to a line 234 bearing solenoid operated control valve $V_{14}$ and being connected to line 226 at 236 valve $V_{14}$, when energized, permitting high pressure condensed refrigerant to feed from the receiver 24 to the inside air coil 16 when it functions as an evaporator, with the vaporized refrigerant returning to the compressor 11 by either of two flow paths. The first is to the suction manifold 28 via line 238 which is connected at point 240 to line 226 on the same side of coil 16 as the discharge manifold, and by way of point 242 to suction manifold 28, line 238 including check valve $C_3$ and solenoid operated control valve $V_6$, this permitting the coil to be essentially at suction pressure. Secondly coil 16 may return to line 136 by means (not shown) when acting as an intermediate pressure evaporator.

The inside air coil 16 may function as an intermediate pressure condenser and receive compressed vapor, particularly when the compressor is staged, via line 156 which connects at point 158 with line 86, exits from the compression module 10 at terminal point 104 and terminates at point 244 where it connects to the line 226 leading to the inside air coil 16. Line 156 includes solenoid operated control valve $V_{10}$ and check valve $C_5$ permitting flow through this line from the compressor to the inside coil but not in the opposite direction. When valve $V_{10}$ is open, solenoid operated control valve $V_5$ is closed, and the inside air coil 16 operates at intermediate condensing pressure.

With respect to the hot water coil 18, this coil is connected only between the discharge manifold 26 and the liquid drain manifold 30 via line 246 at connection points 248 and 250 respectively. Line 246 includes solenoid operated control valve $V_7$ and check valve $C_{11}$. Refrigerant can flow to the coil 18 functioning always as a condenser only when the solenoid operated control valve $V_7$ is open and check valve $C_{11}$ prevents the reverse flow. Since coils 12, 14 and 16 function as evaporator coils, in which case it will be necessary to provide a restriction or other pressure reducing means (not shown) such as an expansion valve in the lines to permit the high pressure liquid refrigerant directed to these coils to expand, when functioning as evaporators, from the receiver 24 through the liquid feed manifold 30. However, such means are conventional and the drawing does not include the same to simplify the illustration of the heat pump system to which the present invention has application in one form.

In order that the crank case be pressured at the highest level of the intermediate pressure returns to the compressor for proper wrist pin load reversal for all cylinders a port 252 is provided within the left cylinder head 13 which permits the pressure within the low side 60 of that cylinder head to reach the underlying crank case common to both cylinders 1 and 2. Additionally, a conduit or line 254 extends from the crank case of left cylinder head 13 to the right cylinder head 15 terminating as at 256 so as to insure pressurization of the crank case or its portion underlying cylinders 3 and 4 at the